(12) United States Patent
Takahashi et al.

(10) Patent No.: US 7,851,088 B2
(45) Date of Patent: Dec. 14, 2010

(54) POSITIVE ELECTRODE ACTIVE MATERIAL FOR NONAQUEOUS ELECTROLYTE SECONDARY BATTERY AND NONAQUEOUS ELECTROLYTE SECONDARY BATTERY

(75) Inventors: Takeshi Takahashi, Tokushima (JP); Takeshi Oba, Tokushima (JP); Kenji Fujino, Tokushima (JP); Junichi Tokuno, Tokushima (JP); Masuhiro Morizaki, Tokushima (JP); Takeyuki Kondo, Tokushima (JP); Jun Seyama, Tokushima (JP)

(73) Assignee: Nichia Corporation, Anan-shi (JP)

( * ) Notice: Subject to any disclaimer, the term of this patent is extended or adjusted under 35 U.S.C. 154(b) by 1016 days.

(21) Appl. No.: 10/806,206

(22) Filed: Mar. 23, 2004

(65) Prior Publication Data

US 2004/0229123 A1 Nov. 18, 2004

(30) Foreign Application Priority Data

Mar. 25, 2003 (JP) .............................. 2003-083806
Jul. 30, 2003 (JP) .............................. 2003-282341
Oct. 20, 2003 (JP) .............................. 2003-358885
Dec. 26, 2003 (JP) .............................. 2003-432856

(51) Int. Cl.
*H01M 4/48* (2010.01)
*H01M 4/52* (2010.01)
*H01M 4/58* (2010.01)
*C01G 51/04* (2006.01)
*C01G 53/04* (2006.01)

(52) U.S. Cl. ................. 429/231.1; 429/223; 429/231.3; 429/231.4; 429/231.95; 429/94; 252/182.1; 423/594.4; 423/594.6

(58) Field of Classification Search ........................ None
See application file for complete search history.

(56) References Cited

U.S. PATENT DOCUMENTS

| 6,241,959 | B1 | 6/2001 | Cho et al. |
|---|---|---|---|
| 6,497,854 | B2 | 12/2002 | Kohiro et al. |
| 6,753,111 | B2 | 6/2004 | Kweon et al. |
| 2001/0046628 | A1 | 11/2001 | Oesten et al. |
| 2002/0061444 | A1 | 5/2002 | Kweon et al. |
| 2002/0110736 | A1 | 8/2002 | Kweon et al. |
| 2002/0127473 | A1 | 9/2002 | Ooya et al. |

(Continued)

FOREIGN PATENT DOCUMENTS

| CA | 2 373 756 | 11/2000 |
|---|---|---|
| CN | 1346160 A | 4/2002 |
| CN | 1350706 A | 5/2002 |

(Continued)

OTHER PUBLICATIONS

Official English Translation of JP 04-319260 published Nov. 10, 1992.*

*Primary Examiner*—Robert Hodge
(74) *Attorney, Agent, or Firm*—Oliff & Berridge, PLC

(57) ABSTRACT

Disclosed is a positive electrode active material for a nonaqueous electrolyte secondary battery having at least a lithium-transition metal composite oxide of a layer structure, in which an existence ratio of at least one selected from the group consisting of elements which may become tetravalent and magnesium is 20% or more on a surface of the lithium-transition metal composite oxide. By use of this positive electrode active material, a nonaqueous electrolyte secondary battery having excellent battery characteristics, specifically, having excellent high rate characteristics, cycle characteristics, low-temperature characteristics, thermal stability, and the like, under the even more harsh environment for use can be realized.

15 Claims, 22 Drawing Sheets

U.S. PATENT DOCUMENTS

| | | |
|---|---|---|
| 2003/0013017 A1 | 1/2003 | Nagayama et al. |
| 2003/0035999 A1* | 2/2003 | Gao et al. .............. 429/231.1 |
| 2004/0048158 A1 | 3/2004 | Okochi et al. |
| 2005/0069774 A1 | 3/2005 | Miyazaki et al. |

FOREIGN PATENT DOCUMENTS

| | | |
|---|---|---|
| JP | A 4-319260 | 11/1992 |
| JP | A 6-168722 | 6/1994 |
| JP | 09147916 A * | 6/1997 |
| JP | A 2000-149950 | 5/2000 |
| JP | A-2001-345102 | 12/2001 |
| JP | A 2002-151078 | 5/2002 |
| JP | A-2002-198051 | 7/2002 |
| JP | A-2004-119172 | 4/2004 |
| JP | A-2004-200101 | 7/2004 |
| JP | A-2005-129489 | 5/2005 |
| TW | 488107 | 5/2002 |
| WO | WO 02/054511 A1 | 7/2002 |
| WO | WO 03/049216 A1 | 6/2003 |

* cited by examiner

POSITIVE ELECTRODE ACTIVE MATERIAL FOR NONAQUEOUS ELECTROLYTE SECONDARY BATTERY AND NONAQUEOUS ELECTROLYTE SECONDARY BATTERY

BACKGROUND OF THE INVENTION

1. Field of the Invention

The present invention relates to a positive electrode active material employed in nonaqueous electrolyte secondary battery such as a lithium ion secondary battery suitably used for cellular phones, personal computers, and electric vehicle, for example.

2. Description of the Related Art

A nonaqueous electrolyte secondary battery is featured to have a high operating voltage and a high energy density as compared with a conventional nickel-cadmium secondary battery and the like, and has been widely used as a power source or the like for mobile electronic appliances such as cellular phones, laptop personal computers, and digital cameras. A positive electrode active material of the nonaqueous electrolyte secondary battery includes lithium-transition metal composite oxides represented by $LiCoO_2$, $LiNiO_2$, and $LiMn_2O_4$. Of those, $LiCoO_2$ has been conventionally used for the mobile electronic appliances, providing sufficient battery characteristics.

However, an environment in which the mobile electronic appliances are used has now become more harsh resulting from high-functionalization such as provisions of various functions, uses in high temperatures or low temperatures, or the like. Further, application of the nonaqueous electrolyte secondary battery to power sources such as batteries for electric vehicles is expected. However, sufficient battery characteristics cannot be obtained with a conventional nonaqueous electrolyte secondary battery employing $LiCoO_2$, and further improvement is required.

JP 4-319260A (the term "JP XX-XXXXXX A" as used herein means an "unexamined published Japanese patent application") describes a positive electrode consisting of $Li_{1-x}CoO_2$ ($0 \leq x < 1$) with zirconium (Zr) added or with a part of its cobalt substituted with other transition metals. JP 4-319260A describes that covering surface of $LiCoO_2$ particle with zirconium oxide ($ZrO_2$) or with a composite oxide of lithium and zirconium ($Li_2ZrO_3$) provides a stable positive electrode. As a result, a positive electrode active material exhibiting excellent cycle characteristics and storage characteristics can be obtained without causing a decomposition reaction of an electrolytic solution or crystal destruction even at high potentials.

However, this positive electrode active material could not meet the high rate characteristics, low-temperature characteristics, and thermal stability required for a recent nonaqueous electrolyte secondary battery. Further, there was a room for improvement in the cycle characteristics as well.

Further, JP 6-168722 A describes a use of $LiMg_xCo_{1-x}O_{2-y}$ ($0<x<1$, $0<y<0.5$, and $x=2y$) as a positive electrode active material. JP 6-168722 A further describes that substituting a part of cobalt with magnesium can solve a problem of an increase in internal resistance of the battery during high discharge, which reduces discharge capacity.

However, sufficient cycle characteristics and low-temperature characteristics could not be obtained with this positive electrode active material.

Further, JP 2002-151078 A describes a positive electrode active material for a nonaqueous electrolyte secondary battery featured to have a part of particle surface of lithium cobaltate particle powder covered with titanium oxide and/or lithium titanate and to be covered with 2.0 to 4.0 mol % (as Ti) of the titanium oxide and/or the lithium titanate with respect to cobalt in the lithium cobaltate particle powder. JP 2002-151078 A further describes that covering a part of the lithium cobaltate particle surface with titanium oxide and/or lithium titanate provides an excellent charge-discharge cycle characteristics in high-temperatures while retaining initial discharge capacity for a secondary battery.

However, sufficient cycle characteristics and initial charge-discharge capacity could not be obtained with the positive electrode active material. Further, the positive electrode active material could not satisfy the high rate characteristics and average potential required for a recent nonaqueous electrolyte secondary battery.

SUMMARY OF THE INVENTION

The present invention has been made in view of the above, and an object of the present invention is therefore to provide a positive electrode active material for a nonaqueous electrolyte secondary battery having excellent battery characteristics under the even more harsh environment for use, and a nonaqueous electrolyte secondary battery employing the positive electrode active material. The present invention more specifically provides a positive electrode active material for a nonaqueous electrolyte secondary battery having excellent high rate characteristics, cycle characteristics, low-temperature characteristics, thermal stability, and the like; and a nonaqueous electrolyte secondary battery employing the positive electrode active material.

The present invention provides (1) to (10) described below.

(1) A positive electrode active material for a nonaqueous electrolyte secondary battery having at least a lithium-transition metal composite oxide of a layer structure, in which an existence ratio of at least one selected from the group consisting of elements which may become tetravalent and magnesium is 20% or more on a surface of the lithium-transition metal composite oxide.

(2) The positive electrode active material for a nonaqueous electrolyte secondary battery according to the above item (1), in which said at least one selected from the group consisting of elements which may become tetravalent and magnesium is zirconium.

(3) The positive electrode active material for a nonaqueous electrolyte secondary battery according to the above item (1), in which said at least one selected from the group consisting of elements which may become tetravalent and magnesium is magnesium.

(4) The positive electrode active material for a nonaqueous electrolyte secondary battery according to the above item (1), in which said at least one selected from the group consisting of elements which may become tetravalent and magnesium is titanium.

(5) The positive electrode active material for a nonaqueous electrolyte secondary battery according to the above item (1), in which said at least one selected from the group consisting of elements which may become tetravalent and magnesium are zirconium and magnesium.

(6) The positive electrode active material for a nonaqueous electrolyte secondary battery according to any one of the above items (1) to (5), in which the lithium-transition metal composite oxide is in a form of particles.

(7) The positive electrode active material for a nonaqueous electrolyte secondary battery according to any one of the above items (1) to (6), in which the lithium-transition metal composite oxide is at least one selected from the group consisting of lithium cobaltate, lithium nickel cobaltate, lithium nickel cobalt aluminate, and lithium nickel cobalt manganate having on at least a surface thereof said at least one selected from the group consisting of elements which may become tetravalent and magnesium.

(8) A positive electrode active material for a nonaqueous electrolyte secondary battery having at least a lithium-transition metal composite oxide of a layer structure, in which the lithium-transition metal composite oxide is at least one selected from the group consisting of lithium nickel cobaltate, lithium nickel cobalt aluminate, and lithium nickel cobalt manganate having on at least a surface thereof at least one selected from the group consisting of zirconium and magnesium.

(9) A positive electrode mixture containing the positive electrode active material for a nonaqueous electrolyte secondary battery according to any one of the above items (1) to (8) and a conductive agent, in which said at least one selected from the group consisting of elements which may become tetravalent and magnesium exists between the positive electrode active material for a nonaqueous electrolyte secondary battery and the conductive agent.

(10) A nonaqueous electrolyte secondary battery including:

a strip positive electrode constituted by forming, on at least one side of a strip positive electrode current collector, a positive electrode active material layer employing the positive electrode active material for a nonaqueous electrolyte secondary battery according to any one of items (1) to (8);

a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating lithium ions; and a strip separator;

in which: the strip positive electrode and the strip negative electrode laminated with the strip separator between them are wound plural times to form a web of the strip positive electrode and the strip negative electrode with the strip separator intervening between them.

DETAILED DESCRIPTION OF THE INVENTION

Below, a positive electrode active material for a nonaqueous electrolyte secondary battery of the present invention (hereinafter, may also be simply referred to as "positive electrode active material of the present invention") and a nonaqueous electrolyte secondary battery will be described.

<Positive Electrode Active Material for a Nonaqueous Electrolyte Secondary Battery>

The positive electrode active material according to a first aspect of the present invention is a positive electrode active material for a nonaqueous electrolyte secondary battery containing at least a lithium-transition metal composite oxide of a layer structure, in which an existence ratio of at least one selected from the group consisting of elements which may become tetravalent and magnesium is 20% or more on a surface of the lithium-transition metal composite oxide.

The positive electrode active material according to a second aspect of the present invention is a positive electrode active material for a nonaqueous electrolyte secondary battery containing at least a lithium-transition metal composite oxide of a layer structure, in which the lithium-transition metal composite oxide is at least one selected from the group consisting of lithium nickel cobaltate, lithium nickel cobalt aluminate, and lithium nickel cobalt manganate having on the surface thereof at least one chosen from the group consisting of zirconium and magnesium.

The positive electrode active material according to either the first and second aspects of the present invention (hereinafter, may also be simply referred to as "positive electrode active material of the present invention") contains at least a lithium-transition metal composite oxide of a layer structure. The layer structure refers to a layered crystal structure of the lithium-transition metal composite oxide. The layer structure is called an $\alpha$-NaFeO$_2$ type structure in which lithium ions and transition metal ions each systematically occupy half of all 6-coordinate sites in a solid matrix of a cubic close-packed oxygen arrangement.

Figure 18:
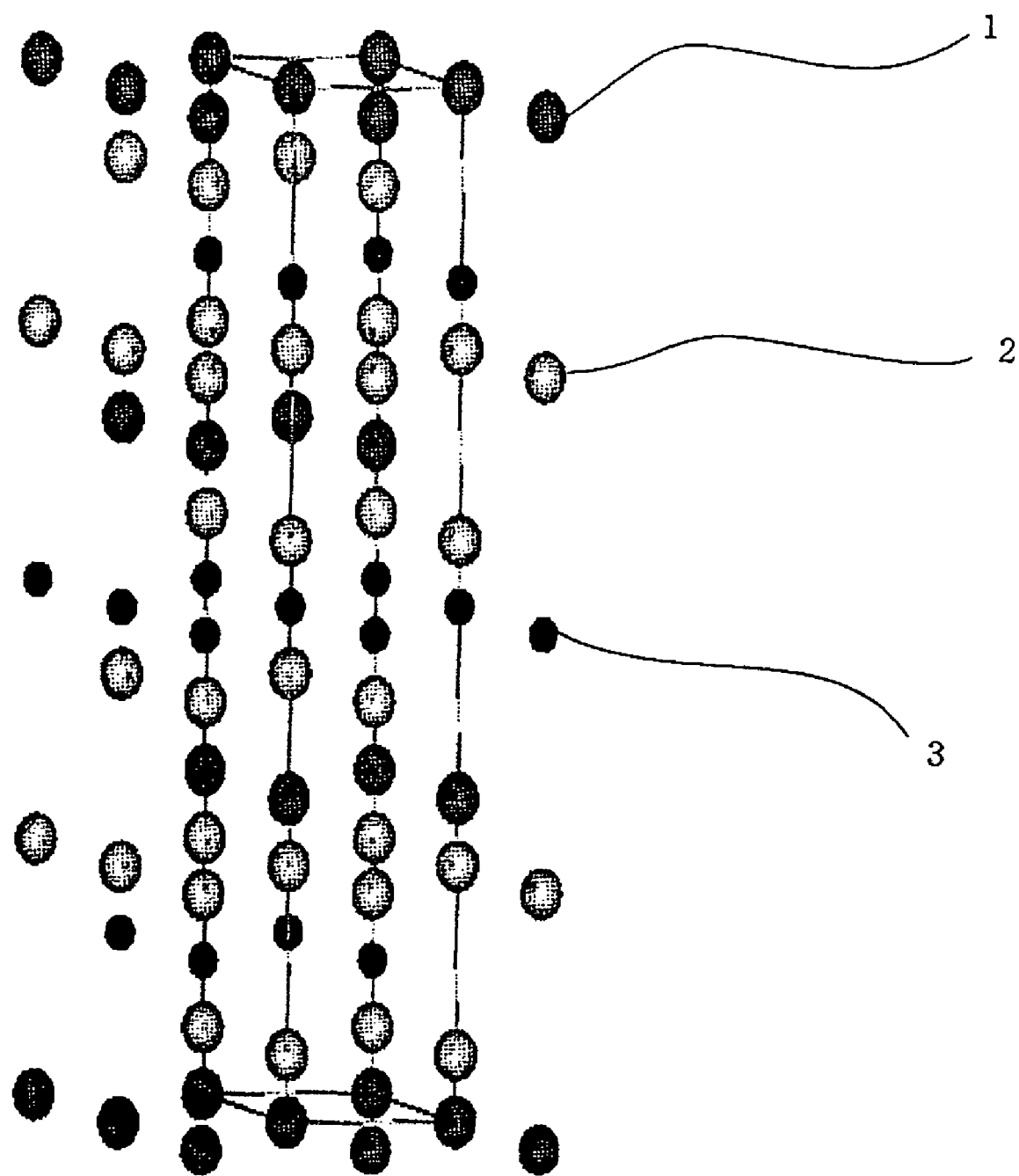
FIG. 18 is a schematic diagram showing a crystal structure of a lithium-transition metal composite oxide of a layer structure.

FIG. 18 is a schematic diagram showing a crystal structure of a lithium-transition metal composite oxide having the layer structure. In FIG. 18, lithium, oxygen, and transition metals occupy 3b sites 3, 6c sites 2, and 3a sites 1, respectively.

The layer structure is not particularly limited, and examples thereof include a layered rock salt structure and a zigzag layered rock salt structure. Of those, the layered rock salt structure is preferable.

The lithium-transition metal composite oxide of the layer structure is not particularly limited. Examples thereof include lithium cobaltate, lithium nickelate, lithium chromate, lithium vanadate, lithium manganate, lithium nickel cobaltate, lithium nickel cobalt manganate, and lithium nickel cobalt aluminate. Preferable examples thereof include lithium cobaltate, lithium nickel cobaltate, lithium nickel cobalt aluminate, and lithium nickel cobalt manganate.

The lithium-transition metal composite oxide suitably used in the present invention will be described in detail below.

The positive electrode active material of the present invention contains at least one selected from the group consisting of elements which may become tetravalent and magnesium on the surface of the lithium-transition metal composite oxide (hereinafter, may also be referred to as "surface element").

A form of the lithium-transition metal composite oxide is not particularly limited. The lithium-transition metal composite oxide may be in a form of particles or films, for example.

According to the present invention, the lithium-transition metal composite oxide is preferably in a form of particles so that the surface element is uniformly dispersed in the lithium-transition metal composite oxide, allowing further improvement of battery characteristics. The particles may exist as primary particles, as secondary particles, or as a mixture thereof.

An existing form of the surface element is not particularly limited, and the surface element can exist as an element or a compound.

Hereinafter, the lithium-transition metal composite oxide in a form of particles in which the surface element exists as a compound will be described as an example. However, the present invention is not limited to the example.

The surface element is not particularly limited as long as it is at least one selected from the group consisting of elements which may become tetravalent and magnesium, but is preferably one selected from the group consisting of zirconium, titanium, and magnesium.

To be specific, the surface element consists of preferably zirconium, magnesium, titanium, or two of zirconium and magnesium.

Zirconium as the surface element provides excellent high rate characteristics, cycle characteristics, low-temperature characteristics, and thermal stability.

Magnesium as the surface element provides excellent cycle characteristics, low-temperature characteristics, and thermal stability.

Titanium as the surface element provides excellent high rate characteristics, excellent thermal stability, and high discharge capacity.

The surface element including two kinds of the element of zirconium and magnesium provides excellent high rate characteristics, excellent cycle characteristics, excellent low-temperature characteristics, excellent thermal stability, and high charging potential.

Examples of a preferable zirconium compound include zirconium oxide and lithium zirconate. Examples of a more preferable zirconium compound include $ZrO_2$ and $Li_2ZrO_3$. A further more preferable zirconium compound is $Li_2ZrO_3$.

Examples of a preferable magnesium compound include magnesium oxide and lithium magnesate. A more preferable magnesium compound is MgO.

Examples of a preferable titanium compound include titanium oxide and lithium titanate. A more preferable titanium compound is lithium titanate.

A titanium compound is preferably lithium titanate which belongs to space group Fm3m. The use of the lithium titanate which belongs to space group Fm3m among various lithium titanates further improves the high rate characteristics.

Further, titanium preferably exists as trivalent. The titanium generally exists as tetravalent, but existence of stable trivalent titanium further improves the high rate characteristics.

The surface element is preferably fixed to the surface of the lithium-transition metal composite oxide. According to the present invention, "fixed" refers to a state of the surface element not liberating from the lithium-transition metal composite oxide even when the positive electrode active material of the present invention is stirred in water or an organic solvent. Fixing the surface element to the surface of the lithium-transition metal composite oxide preferably prevents the surface element to liberate from the surface of the lithium-transition metal composite oxide during slurry preparation.

A compound of the surface element, existing on surface of lithium-transition metal composite oxide particles in any form, exhibits effect of the present invention. The above-mentioned effects are exhibited even when the compound of the surface element uniformly covers the entire particle surface of the lithium-transition metal composite oxide or even when the compound of the surface element uniformly covers a part of the particle surface of the lithium-transition metal composite oxide, for example. However, the particles of the lithium-transition metal composite oxide completely covered with a thick layer of such compound are not preferable because the discharge capacity may decrease as described below.

The compound of the surface element more preferably covers uniformly the entire particle surface of the lithium-transition metal composite oxide. Uniform covering of the entire particle surface with zirconium as the surface element not only improves the high rate characteristics, the low-temperature characteristics, the cycle characteristics, and the thermal stability, but also provides a positive electrode active material for a nonaqueous electrolyte secondary battery with improved high-high rate characteristics and low-temperature high rate characteristics. Further, magnesium as the surface element further improves the cycle characteristics and the low-temperature characteristics. Further, titanium as the surface element improves the cycle characteristics, high rate characteristics, and the thermal stability. Further, the surface element consisting of zirconium and magnesium improves the cycle characteristics and the thermal stability at high charging potentials.

Further, the compound of the surface element may just exist on at least surface of particle of the lithium-transition metal composite oxide. Therefore, the compound of the surface element may also exist inside the particles of the lithium-transition metal composite oxide. The compound of the surface element existing inside the particles may be incorporated into the crystal structure of the lithium-transition metal composite oxide in this case. It is assumed that the compound of the surface element existing inside the particles stabilizes the crystal structure of the particles of the lithium-transition metal composite oxide and further improves the cycle characteristics.

Further, magnesium and titanium forming a solid solution possibly causes a pillar effect, thereby improving the thermal stability.

The existence of the compound of the surface element on particle surface of the lithium-transition metal composite oxide can be analyzed by various methods. Examples of the methods include Auger Electron Spectroscopy (AES) and X-ray Photoelectron Spectroscopy (XPS).

Further, an amount of the compound of the surface element can be determined by various methods. Examples of the methods include Inductively Coupled Plasma (ICP) spectroscopy and a titration method.

The lithium-transition metal composite oxide employed in a positive electrode active material according to the first aspect of the present invention has an existence ratio of the surface element (at least one kind of the surface element if two or more kinds thereof exist) of 20% or more on the surface thereof. Further, the existence ratio of the surface element on the surface of the lithium-transition metal composite oxide employed in a positive electrode active material according to the second aspect of the present invention is not particularly limited, but is preferably 20% or more on the surface of the lithium-transition metal composite oxide.

The following effects can be exhibited depending on the kinds of the surface element in this case because the surface element is uniformly dispersed on the surface of the lithium-transition metal composite oxide, that is, not unevenly distributed locally.

(1) When Zirconium Employed as Surface Element

When zirconium is employed as a surface element, presumably, interface resistance reduces, increasing a discharging potential under load at room temperatures and low temperatures, to thereby improve a capacity maintenance ratio under load. In other words, the high rate characteristics and the low-temperature characteristics improve.

Further, local precipitation of lithium on a negative electrode can be suppressed during charge. Therefore, gas generation can be suppressed during charge and dryout can be prevented, thereby improving the cycle characteristics.

Further, uniform existence of the zirconium compound on the surface suppresses oxygen release and improves the thermal stability.

Thus, the obtained positive electrode active material has excellent cycle characteristics, low-temperature characteristics, and thermal stability, as well as excellent high rate characteristics and low-temperature high rate characteristics.

(2) When Magnesium Employed as Surface Element

When magnesium is employed as a surface element, presumably, contact of the lithium-transition metal composite oxide with electrolytic solution reduces and side reactions are suppressed, to thereby improve the cycle characteristics.

Further, elution of the transition metal ions can be suppressed, thereby improving the cycle characteristics.

Further, magnesium uniformly existing on the surface functions as an entrance for lithium ions, thereby improving the low-temperature characteristics.

Further, power characteristics also improve when the lithium-transition metal composite oxide is one kind of a lithium compound selected from the group consisting of lithium nickel cobaltate, lithium nickel cobalt aluminate, and lithium nickel cobalt manganate.

(3) When Titanium Employed as Surface Element

When titanium is employed as a surface element, presumably, the interface resistance further reduces, thereby improving the high rate characteristics and the low-temperature high rate characteristics.

The further reduction of the interface resistance prevents generation of excess resistance during electron migration, suppressing potential loss, to thereby raise an average potential.

Further, titanium uniformly existing on the surface of the lithium-transition metal composite oxide functions as a buffer during transfer of the lithium ions from the negative electrode to the positive electrode, suppressing destruction of the crystal structure, to thereby improve the cycle characteristics.

Further, the uniform existence of titanium on the surface of the lithium-transition metal composite oxide keeps the charge of the lithium-transition metal composite oxide stable when lithium is released and suppresses oxygen release. Thus, the crystal structure may be stably maintained during charge, to thereby improve the thermal stability.

(4) When Zirconium and Magnesium Employed as Surface Element

When zirconium and magnesium are employed as surface elements, presumably, zirconium uniformly existing on the surface of the lithium-transition metal composite oxide functions as a buffer during transfer of the lithium ions from the negative electrode to the positive electrode during discharge after charging to high potentials, suppressing destruction of the crystal structure, to thereby improve the cycle characteristics at high charging potentials.

Further, the uniform existence of zirconium on the surface further reduces the interface resistance during discharge after charging to high potentials, thereby improving the high rate characteristics at high charging potentials.

However, the uniform existence of the above-mentioned elements on the surface improves the cycle characteristics and the high rate characteristics at high charging potentials, but leaves room for improvement of the thermal stability at high charging potentials.

Correspondingly, not only the zirconium but also the magnesium uniformly existing on the surface keep the charge of the lithium-transition metal composite oxide stable when lithium is released by charging and suppresses oxygen release, thereby stably maintaining the crystal structure during charge to high potentials. Thus, the thermal stability at high charging potentials improves without deteriorating excellent cycle characteristics and high rate characteristics at high charging potentials.

Further, according to any one of the first and second aspects of the present invention, the lithium-transition metal composite oxide has an existence ratio of surface element on the surface of preferably 40% or more, more preferably 50% or more, still preferably 60% or more, and yet more preferably 80% or more.

A large existence ratio of zirconium provides better high rate characteristics under higher load (high-high rate characteristics) and high rate characteristics at low temperatures (low-temperature high rate characteristics). Further, the cycle characteristics also improve.

A large existence ratio of magnesium provides better cycle characteristics and power characteristics. Further, the thermal stability also improves.

A large existence ratio of titanium provides better cycle characteristics, high rate characteristics, and thermal stability.

According to the present invention, "existence ratio of the surface element on surface of lithium-transition metal composite oxide" can be determined by the following. Note that, the surface element is zirconium in the following description as an example.

First, a group of particles of a lithium-transition metal composite oxide is observed for an existence state of zirconium on particle surface using an electron probe microanalyzer (EPMA) equipped with a wavelength dispersive X-ray photospectrometer (WDX). Then, a part at which the amount of zirconium per unit area is the largest (part with the highest zirconium peak, that is, part with the maximum peak) in a visual field of the observation is selected and line analysis is performed along a line segment (line segment having a length of 260 μm or 300 μm, for example) passing through this part. In the line analysis, sum of lengths of parts having peak values of 4% or more, defining that the above-mentioned part at which the amount of zirconium per unit area is largest has a peak value (maximum peak value) of 100%, is divided by the length of the line segment. The quotient is defined as an "existence ratio of zirconium on surface of lithium-transition metal composite oxide". Note that an average value of the "existence ratio of zirconium on surface of lithium-transition metal composite oxide" is preferably determined by repeating the line analysis on any surface of the lithium-transition metal composite oxide for a plurality of times (10 times, for example).

In the above-mentioned method, parts at which the peak value of zirconium is less than 4% are not included in the existence ratio of the present invention because of a large difference with the part at which the amount of zirconium per unit area is largest.

The above-mentioned "existence ratio of zirconium on surface of lithium-transition metal composite oxide" can express whether zirconium exists uniformly or exists unevenly on the surface of the lithium-transition metal composite oxide. To be specific, the larger the existence ratio is, the more uniformly the zirconium exists on the surface of the lithium-transition metal composite oxide.

The existence ratio of magnesium as the surface element on the surface of the lithium-transition metal composite oxide can be determined similarly to the method described above.

The existence ratio of titanium as the surface element on the surface of the lithium-transition metal composite oxide can be determined similarly to the method described above except that the lengths of parts having peak values of 8% or more are used instead of the lengths of parts having peak values of 4% or more.

According to the first aspect of the present invention, the existence ratio of the surface element on the surface of the lithium-transition metal composite oxide is 20% or more as described above. In other words, the following relationships are satisfied when performing the line analysis along a line segment passing through a part with the maximum peak of the surface element on the surface of the lithium-transition metal composite oxide.

(1) When Zirconium Employed as Surface Element (Sum of lengths of parts having peak values of 4% or more when maximum peak value of zirconium is defined as 100%)/(length of line segment)≧0.2

(2) When Magnesium Employed as Surface Element (Sum of lengths of parts having peak values of 4% or more when maximum peak value of magnesium is defined as 100%)/(length of line segment)≧0.2

(3) When Titanium Employed as Surface Element (Sum of lengths of parts having peak values of 8% or more when maximum peak value of titanium is defined as 100%)/(length of line segment)≧0.2

(4) When Two of Zirconium and Magnesium Employed as Surface Element

At least one, preferably both of the following relationships are satisfied:

(Sum of lengths of parts having peak values of 4% ore more when maximum peak value of zirconium is defined as 100%)/(length of line segment)≧0.2

(Sum of lengths of parts having peak values of 4% ore more when maximum peak value of magnesium is defined as 100%)/(length of line segment)≧0.2

The ratio of the parts having peak values of zirconium of 70% or more when maximum peak value of zirconium is defined as 100% is preferably not 100% when the surface element is zirconium because the discharge capacity may decrease. The surface of the lithium-transition metal composite oxide is probably covered with a thick layer of zirconium at this time.

According to the positive electrode active material of the present invention, the zirconium compound exists on the surface of the lithium-transition metal composite oxide in a ratio of preferably 0.01 to 2 mol % zirconium with respect to the lithium-transition metal composite oxide when the surface element is zirconium. The ratio of 0.01 mol % or more preferably allows the zirconium compound to exist on the entire surface of the lithium-transition metal composite oxide. The ratio of 2 mol % or less preferably increases the discharge capacity. The ratio of zirconium is more preferably 0.02 to 0.3 mol %, further more preferably 0.04 to 0.25 mol %.

The ratio of zirconium within the above range not only improves the low-temperature characteristics, the cycle characteristics, and the thermal stability, but also provides a positive electrode active material for a nonaqueous electrolyte secondary battery with improved high-high rate characteristics and low-temperature high rate characteristics.

According to the positive electrode active material of the present invention, magnesium exists on the surface of the lithium-transition metal composite oxide in a ratio of: preferably 0.1 mol % or more, more preferably 0.5 mol % or more, and further more preferably 1 mol % or more; and preferably 5 mol % or less, more preferably 4 mol % or less, and further more preferably 3 mol % or less, with respect to the lithium-transition metal composite oxide when the surface element is magnesium. A too small ratio of magnesium existing on the surface of the lithium-transition metal composite oxide undesirably inhibits magnesium from existing on the entire surface of the lithium-transition metal composite oxide. A too large ratio of magnesium existing on the surface of the lithium-transition metal composite oxide undesirably causes reduction in discharge capacity.

According to the positive electrode active material of the present invention, titanium exists on the surface of the lithium-transition metal composite oxide in a ratio of: preferably 0.01 mol % or more, more preferably 0.05 mol % or more, and further more preferably 0.1 mol % or more; and preferably 3 mol % or less, more preferably 2 mol % or less, and further more preferably 1 mol % or less, with respect to the lithium-transition metal composite oxide when the surface element is titanium. A too small ratio of titanium existing on the surface of the lithium-transition metal composite oxide undesirably inhibits titanium from existing on the entire surface of the lithium-transition metal composite oxide. A too large ratio of titanium existing on the surface of the lithium-transition metal composite oxide undesirably causes reduction in discharge capacity.

According to the positive electrode active material of the present invention, zirconium exists on the surface of the lithium-transition metal composite oxide in a ratio of: preferably 0.01 mol % or more, more preferably 0.05 mol % or more, and further more preferably 0.1 mol % or more; and preferably 3 mol % or less, more preferably 2 mol % or less, and further more preferably 1 mol % or less, with respect to the lithium-transition metal composite oxide when the surface element consists of two of zirconium and magnesium. A too small ratio of zirconium existing on the surface of the lithium-transition metal composite oxide undesirably inhibits zirconium from existing on the entire surface of the lithium-transition metal composite oxide. A too large ratio of zirconium existing on the surface of the lithium-transition metal composite oxide undesirably causes reduction in discharge capacity.

Further, magnesium exists on the surface of the lithium-transition metal composite oxide in a ratio of: preferably 0.01 mol % or more, more preferably 0.1 mol % or more, and further more preferably 0.5 mol % or more; and preferably 3 mol % or less, more preferably 2 mol % or less, and further more preferably 1 mol % or less, with respect to the lithium-transition metal composite oxide. A too small ratio of magnesium existing on the surface of the lithium-transition metal composite oxide undesirably inhibits magnesium from existing on the entire surface of the lithium-transition metal composite oxide. A too large ratio of magnesium existing on the surface of the lithium-transition metal composite oxide undesirably causes reduction in discharge capacity.

A preferable embodiment of the present invention includes that the lithium-transition metal composite oxide contain aluminum in addition to the above surface elements on the surface thereof. Inclusion of aluminum on the surface further improves the thermal stability at high charging potentials.

The existence ratio of aluminum on the surface of the lithium-transition metal composite oxide is preferably 20% or more, more preferably 40% or more, and further more preferably 60% or more.

The amount of aluminum can be determined by various methods similarly used in determination of the amount of the surface element.

Zirconium, magnesium, and aluminum uniformly existing on the surface of the lithium-transition metal composite oxide particularly provide the following effects.

As described above, the uniform existence of zirconium on the surface of the lithium-transition metal composite oxide improves the cycle characteristics and the high rate characteristics, but leaves room for improvement of the thermal stability and the power characteristics at high charging potentials. The uniform existence of magnesium in addition to zirconium improves the thermal stability at high charging potentials without deteriorating excellent cycle characteristics and high rate characteristics at high charging potentials. Further, the uniform existence of zirconium and magnesium reduces interface resistance and improves power characteristics at high charging potentials without deteriorating excellent cycle characteristics and high rate characteristics at high charging potentials.

The uniform existence of aluminum in addition to zirconium and magnesium keeps the charge of the lithium-transition metal composite oxide stable when lithium is released by charging and suppresses oxygen release, thereby stably maintaining the crystal structure. Thus, the thermal stability at high charging potentials can be improved without deteriorating excellent cycle characteristics, high rate characteristics, and output characteristic at high charging potentials.

Aluminum exists on the surface of the lithium-transition metal composite oxide in a ratio of: preferably 0.01 mol % or more, more preferably 0.1 mol % or more, and further more preferably 0.5 mol % or more; and preferably 3 mol % or less, more preferably 2 mol % or less, and further more preferably 1 mol % or less, with respect to the lithium-transition metal composite oxide. A too small ratio of aluminum existing on the surface of the lithium-transition metal composite oxide undesirably inhibits aluminum from existing on the entire surface of the lithium-transition metal composite oxide. A too large ratio of aluminum existing on the surface of the lithium-transition metal composite oxide undesirably causes reduction in discharge capacity.

According to the present invention, the "existence ratio of aluminum on surface of lithium-transition metal composite oxide" can be determined similarly as in the case of zirconium. The "existence ratio of aluminum on surface of lithium-transition metal composite oxide" can express whether aluminum exists uniformly or exists unevenly on the surface of the lithium-transition metal composite oxide.

Hereinafter, the lithium-transition metal composite oxide suitably used in the present invention will be exemplified. Note that all of the lithium-transition metal composite oxides at least contain the surface element on the surface thereof. However, the existence ratio of the surface element is 20% or more on the surface of the lithium-transition metal composite oxide according to the first aspect of the present invention. Further, the surface element is at least one kind of the element chosen from the group consisting of zirconium and magnesium for the lithium-transition metal composite oxide according to the second aspect of the present invention.

(1) At Least One Selected From the Group Consisting of Lithium Cobaltate, Lithium Nickel Cobaltate, Lithium Nickel Cobalt Aluminate, and Lithium Nickel Cobalt Manganate Lithium cobaltate or lithium nickel cobaltate as the lithium-transition metal composite oxide provides a positive electrode active material for a nonaqueous electrolyte secondary battery with further improved cycle characteristics, excellent high rate characteristics, excellent low-temperature characteristics, and excellent thermal stability. Therefore, the nonaqueous electrolyte secondary battery employing the positive electrode active material can be suitably used for applications such as cellular phones and laptop personal computers.

Lithium nickel cobalt aluminate as the lithium-transition metal composite oxide provides a positive electrode active material for a nonaqueous electrolyte secondary battery with further improved high rate characteristics, low-temperature characteristics, power characteristics, cycle characteristics, and thermal stability. Therefore, the nonaqueous electrolyte secondary battery employing the positive electrode active material can be suitably used for applications such as electric vehicles, cellular phones, and laptop personal computers.

Lithium nickel cobalt manganate as the lithium-transition metal composite oxide provides a positive electrode active material for a nonaqueous electrolyte secondary battery with further improved high rate characteristics, low-temperature characteristics, power characteristics, cycle characteristics, and thermal stability. Therefore, the nonaqueous electrolyte secondary battery employing the positive electrode active material can be suitably used for applications such as cellular phones, electrically powered tools, and electric vehicles.

Lithium nickel cobaltate, lithium nickel cobalt aluminate, and lithium nickel cobalt manganate have layer crystal structures similar to that of lithium cobaltate.

However, those compounds conventionally had problems in that much gas would generate and potential during discharge was reduced compared to lithium cobaltate.

According to the present invention, the existence of the surface element on the surfaces of those compounds reduces residual lithium in starting materials, allowing prevention of gas generation during charge.

Further, the interface resistance reduces, increasing discharging potential under load at room temperatures and low temperatures, to thereby improve capacity maintenance ratio under load. In other words, it is assumed that the high rate characteristics and the low-temperature characteristics improve.

Further, presumably, local precipitation of lithium on a negative electrode can be suppressed during charge. Therefore, gas generation can be suppressed during charge and dryout can be prevented, thereby improving the cycle characteristics.

Further, the existence of the surface element on the surface may possibly suppress oxygen release and improves the thermal stability.

Therefore, the second aspect of the present invention utilizing the lithium-transition metal composite oxide of at least one kind of the compound selected from the group consisting of lithium nickel cobaltate, lithium nickel cobalt aluminate, and lithium nickel cobalt manganate which at least contains a surface element on the surface thereof, is effective.

(2) Lithium Cobaltate Containing at Least One Kind of the Element Selected From the Group Consisting of Transition Metals Except Cobalt, Elements of Group 2, Group 13, and group 14 of the periodic table, halogen elements, and Sulfur The inclusion of those elements further improves the high rate characteristics, the low-temperature characteristics, the cycle characteristics, and the thermal stability.

Among those, preferable lithium cobaltate is represented by the general formula $Li_xCoO_y$ (where, $0.95 \leq x \leq 1.10$ and $1.8 \leq y \leq 2.2$).

A preferable specific example of lithium cobaltate is a lithium-transition metal composite oxide represented by the general formula $Li_aCO_{1-b}M_bO_cX_dS_e$ (where, M represents at least one kind of the element selected from the group consisting of transition metals except cobalt and elements of group 2, group 13, and group 14 in the periodic table; X represents at least one kind of the element selected from halogen elements; $0.95 \leq a \leq 1.10$; $0 < b \leq 0.10$; $1.8 \leq c \leq 2.2$; $0 \leq d \leq 0.10$; and $0 \leq e \leq 0.015$).

(3) Lithium Nickel Cobaltate Containing at Least One Kind of the Element Selected From the Group Consisting of Transition Metals Except Nickel and Cobalt, Elements of Group 2, Group 13, and Group 14 in the Periodic Table, Halogen Elements, and Sulfur; Lithium Nickel Cobalt Aluminate Containing at Least One Kind of the Element Selected From the Group Consisting of Transition Metals Except Nickel and Cobalt, Elements of Group 2, Group 13 Except Aluminum, and Group 14 in the Periodic Table, Halogen Elements, and Sulfur; and Lithium Nickel Cobalt Manganate Containing at Least one Kind of the Element Selected From the Group Consisting of Transition Metals Except Nickel, Cobalt, and Manganese, Elements of Group 2, Group 13, and Group 14 in the Periodic Table, Halogen Elements, and Sulfur The inclusion of those elements further improves the high rate characteristics, the low-temperature characteristics, the power characteristics, the cycle characteristics, and the thermal stability. Therefore, the nonaqueous electrolyte secondary battery employing the positive electrode active material can be suitably used for applications such as electrically powered tools, electric vehicles, cellular phones, and laptop personal computers.

Among those, a preferable lithium-transition metal composite oxide containing at least one kind of the element selected from the group consisting of transition metals except Co and Ni (transition metals except Co, Ni, and Mn when Z represents Mn in the following general formula), elements of group 2, group 13 (elements of group 13 except Al when Z represents Al in the following general formula), and group 14 in the periodic table, halogen elements, and S is represented by the general formula $Li_kNi_mCo_pZ_{(1-m-p)}O_r$ (where, Z represents Al or Mn, $0.95 \leq k \leq 1.10$, $0.1 \leq m \leq 0.9$, $0.1 \leq p \leq 0.9$, $m+p \leq 1$, and $1.8 \leq r \leq 2.2$).

A preferable specific example thereof includes a lithium-transition metal composite oxide represented by the general formula $Li_kNi_mCo_pZ_{(1-m-p)}O_r$ (where, Z represents Al or Mn, $0.95 \leq k \leq 1.10$, $0.1 \leq m \leq 0.9$, $0.1 \leq p \leq 0.9$, $m+p \leq 1$, and $1.8 \leq r \leq 2.2$).

(4) Lithium Cobaltate Containing at Least One Selected From the Group Consisting of Titanium, Aluminum, Vanadium, Zirconium, Magnesium, Calcium, Strontium, and Sulfur Here, presumably, existence of those elements causes a pillar effect, thereby improving the cycle characteristics through stabilization of a crystal structure. Further, the cycle characteristics may also improve through surface modification.

Lithium cobaltate more preferably contains at least one selected from the group consisting of titanium, aluminum, zirconium, and magnesium. The inclusion of at least one selected from the group consisting of titanium, aluminum, zirconium, and magnesium further improves the cycle characteristics. The inclusion of magnesium further improves the thermal stability in addition to the above effects.

Further, the inclusion of sulfur improves electron passage, thereby further improving the cycle characteristics and the high rate characteristics.

A sulfur content is preferably 0.03 to 0.7 wt % with respect to the total of the lithium-transition metal composite oxide and sulfur. If the sulfur content is smaller than 0.03 wt %, resistance to electron migration may be hardly reduced. If the sulfur content is larger than 0.7 wt %, gas generation may occur from moisture adsorption.

Sulfur may exist in any form. Sulfur may exist in a form of a sulfate group, for example.

The sulfate group includes a sulfate ion, a cluster of atoms of the sulfate ion with electrons removed, and a sulfo group. The sulfate group is preferably based on at least one selected from the group consisting of alkali metal sulfates, alkali earth metal sulfates, organic sulfates, and organic sulfonic acids and salts thereof.

Of those, the sulfate group is preferably based on at least one selected from the group consisting of alkali metal sulfates and alkali earth metal sulfates, and is more preferably based on alkali metal sulfates. The reason is that alkali metal sulfates are formed through bonding of a strong acid and a strong base and are chemically stable.

The sulfate group preferably exists on particle surface of the lithium-transition metal composite oxide. It is assumed that the inclusion of the sulfate group on the particle surface allows easy electron passage, thereby further improving the high rate characteristics.

The high rate characteristics further improve even when the sulfate group covers the entire particle surface of the lithium-transition metal composite oxide or even when the sulfate group covers a part of the particle surface of the lithium-transition metal composite oxide.

Among those, a preferable lithium cobaltate is represented by the general formula $Li_xCoO_y$, (where, $0.95 \leq x \leq 1.10$ and $1.8 \leq y \leq 2.2$).

(5) At Least One Selected From the Group Consisting of Lithium Nickel Cobaltate, Lithium Nickel Cobalt Aluminate, and Lithium Nickel Cobalt Manganate Containing at Least One Selected From the Group Consisting of Titanium, Aluminum, Vanadium, Zirconium, Magnesium, Calcium, Strontium, and Sulfur The effects, the contents, and the like of those elements are the same as in the embodiment (4) of the present invention.

Among those, a preferable lithium-transition metal composite oxide containing at least one selected from the group consisting of Ti, Al, V, Zr, Mg, Ca, Sr, and S is represented by the general formula $Li_kNi_mCo_pZ_{(1-m-p)}O_r$ (where, Z represents Al or Mn, $0.95 \leq k \leq 1.10$, $0.1 \leq m \leq 0.9$, $0.1 \leq p \leq 0.9$, $m+p \leq 1$, and $1.8 \leq r \leq 2.2$).

A preferable specific example thereof includes a lithium-transition metal composite oxide represented by the general formula $Li_aCO_{1-b}M_bO_cX_dS_e$ (where, M represents at least one selected from the group consisting of Ti, Al, V, Zr, Mg, Ca, and Sr; X represents at least one of the halogen elements; $0.95 \leq a \leq 1.10$, $0 < b \leq 0.10$, $1.8 \leq c \leq 2.2$, $0 \leq d \leq 0.10$, and $0 \leq e \leq 0.015$).

The lithium-transition metal composite oxide preferably has a specific surface area of 0.2 to 3 $m^2/g$. If the specific surface area is too small, particle size of the positive electrode active material becomes too large, thereby decreasing the battery characteristics. If the specific surface area is too large, reactivity in an oxidation decomposition reaction of electrolytic solution on the surface of or in the vicinity of the positive electrode active material increases, thereby increasing the amount of gas generated. The specific surface area within the above range allows reduction of gas generation and provides better cycle characteristics and high rate characteristics without hindering improvements in the low-temperature characteristics, the power characteristics, and the thermal stability.

The specific surface area can be measured by a nitrogen gas adsorption method.

The lithium-transition metal composite oxide preferably contains particles having a volume-based particle diameter of 50 µm or more in a ratio of 10 vol % or less with respect to the total particles. The ratio of the particles within the above range can improve coating characteristics and slurry properties without hindering improvements in the high rate characteristics, the low-temperature characteristics, the power characteristics, and the thermal stability.

According to a preferable embodiment of the present invention, at least a part of the surface of the lithium-transition metal composite oxide is coated with a coat layer consisting of powders of $Al_2O_3$ and/or $LiTiO_2$.

Presumably, the coat layer consisting of the $Al_2O_3$ powder can possibly reduce a migration speed in an electrical double layer, thereby maintaining a balance with the migration speed of lithium ions in a crystal lattice. Therefore, voltage drop can be reduced without hindering improvements in the high rate characteristics and the high-high rate characteristics.

Further, the coat layer consisting of the $LiTiO_2$ powder can further improve the high rate characteristics without hindering improvements in the high rate characteristics and the high-high rate characteristics because a specific phenomenon occurs in transfer of lithium ions during charge. $LiTiO_2$ preferably belongs to a space group Fm3m.

<Production Method for Positive Electrode Active Material for Nonaqueous Electrolyte Secondary Battery>

Production method for the positive electrode active material of the present invention is not particularly limited. The positive electrode active material can be produced through the following (1) and (2), for example.

(1) Preparation of a Starting Material Mixture

Compounds described below are mixed such that each constituent element exists in a predetermined compositional ratio, to thereby obtain a starting material mixture. The compounds used for preparing the starting material mixture are selected depending on the elements that constitute the target composition.

A mixing method is not particularly limited, and examples thereof include: a method in which the compounds are mixed using water and/or an organic solvent to form a slurry, and then dried to obtain a starting material mixture; a method in which aqueous solutions of the above-mentioned compounds are mixed to form a precipitate, which then is dried to obtain a starting material mixture; and a method using those methods in combination.

Hereinafter, compounds that can be used for preparing a starting material mixture will be exemplified.

The lithium compound is not particularly limited, and examples thereof include lithium carbonate, lithium hydroxide, lithium fluoride, lithium chloride, lithium nitrate, lithium sulfate, lithium hydrogen carbonate, lithium oxalate, lithium bromide, lithium iodide, lithium oxide, and lithium peroxide. Of those, $Li_2CO_3$, LiOH, LiOH. $H_2O$, $Li_2O$, LiCl, $LiNO_3$, $Li_2SO_4$, $LiHCO_3$, and $Li(CH_3COO)$ are preferable.

The cobalt compound is not particularly limited, and examples thereof include cobalt oxide, cobalt hydroxide, cobalt carbonate, cobalt chloride, cobalt iodide, cobalt sulfate, cobalt bromate, and cobalt nitrate. Of those, $CoSO_4.7H_2O$ and $Co(NO_3)_2.6H_2O$ are preferable.

The nickel compound is not particularly limited, and examples thereof include nickel oxide, nickel hydroxide, nickel carbonate, nickel chloride, nickel bromide, nickel iodide, nickel sulfate, nickel nitrate, and nickel formate. Of those, $NiSO_4.6H_2O$ and $Ni(NO_3)_2.6H_2O$ are preferable.

The manganese compound is not particularly limited, and examples thereof include manganese oxide, manganese hydroxide, manganese carbonate, manganese chloride, manganese iodide, manganese sulfate, and manganese nitrate. Of those, $MnSO_4$ and $MnCl_2$ are preferable.

The aluminum compound is not particularly limited, and examples thereof include aluminum oxide, aluminum hydroxide, aluminum carbonate, aluminum chloride, aluminum iodide, aluminum sulfate, and aluminum nitrate. Of those, $Al_2(SO_4)_3$ and $Al(NO_3)_3$ are preferable.

The sulfur-containing compound is not particularly limited, and examples thereof include sulfides, sulfur iodide, hydrogen sulfide, sulfuric acid and salts thereof, and nitrogen sulfide. Of those, $Li_2SO_4$, $MnSO_4$, $(NH_4)_2SO_4$, $Al_2(SO_4)_3$, and $MgSO_4$ are preferable.

The compound containing the halogen elements is not particularly limited, and examples thereof include hydrogen fluoride, fluorine oxide, hydrofluoric acid, hydrogen chloride, hydrochloric acid, chlorine oxide, chloride oxyfluoride, bromine oxide, bromine fluorosulfate, hydrogen iodide, iodine oxide, and periodic acid. Of those, $NH_4F$, $NH_4Cl$, $NH_4Br$, $NH_4I$, $LiF$, $LiCl$, $LiBr$, $LiI$, $MnF_2$, $MnCl_2$, $MnBr_2$, and $MnI_2$ are preferable.

The boron compound is not particularly limited, and examples thereof include borides, boron oxides, and boron phosphates. Of those, $B_2O_3$ and $H_3BO_3$ are preferable.

The zirconium compound is not particularly limited, and examples thereof include zirconium fluoride, zirconium chloride, zirconium bromide, zirconium iodide, zirconium oxide, zirconium sulfide, zirconium carbonate, zirconium sulfate, zirconium nitrate, zirconium oxalate, and zirconium oxychloride. Of those, $ZrF_2$, $ZrCl$, $ZrCl_2$, $ZrBr_2$, $ZrI_2$, $ZrO$, $ZrO_2$, $ZrS_2$, $Zr(OH)_3$, $Zr(SO_4)_2$, $ZrOCl_2$, and the like are preferable.

The magnesium compound is not particularly limited, and examples thereof include $MgO$, $MgCO_3$, $Mg(OH)_2$, $MgCl_2$, $MgSO_4$, $Mg(NO_3)_2$, $Mg(CH_3COO)_2$, magnesium iodide, and magnesium perchlorate. Of those, $MgSO_4$ and $Mg(NO_3)_2$ are preferable.

The titanium compound is not particularly limited, and examples thereof include titanium fluoride, titanium chloride, titanium bromide, titanium iodide, titanium oxide, titanium sulfide, and titanium sulfate. Of those, $TiO$, $TiO_2$, $Ti_2O_3$, $TiCl_2$, and $Ti(SO_4)_2$ are preferable.

Further, a compound which may also be used contains two or more of the respective above-mentioned elements.

Hereinafter, a preferable method of obtaining a starting material mixture will be described in detail by way of examples.

(i) First Method

An aqueous solution containing cobalt ions and surface element (zirconium, magnesium, and titanium, for example) ions of predetermined compositional ratios, which is prepared using the above-mentioned cobalt compounds and compounds of at least one surface element (zirconium compounds, magnesium compounds, or titanium compounds, for example), is added dropwise to stirred purified water.

Then, an aqueous solution of sodium hydroxide is added dropwise so that a pH of the mixture falls within 7 to 11. The mixture is stirred at 40 to 80° C. and 500 to 1,500 rpm to precipitate cobalt and the surface element, to thereby obtain salt of cobalt and the surface element. Note that an alkali solution such as an aqueous solution of ammonium hydrogen carbonate, an aqueous solution of sodium hydrogen carbonate, an aqueous solution of potassium hydroxide, and an aqueous solution of lithium hydroxide can be used in place of the aqueous solution of sodium hydroxide.

Further, similar to the above, nickel and the surface element are precipitated when the lithium-transition metal composite oxide employed in the present invention is lithium nickelate, to thereby obtain a precipitate. Nickel, cobalt, and the surface element are precipitated when the lithium-transition metal composite oxide employed in the present invention is lithium nickel cobaltate, to thereby obtain a precipitate. Nickel, cobalt, aluminum, and the surface element are precipitated when the lithium-transition metal composite oxide employed in the present invention is lithium nickel cobalt aluminate, to thereby obtain a precipitate. Nickel, cobalt, manganese, and the surface element are precipitated when the lithium-transition metal composite oxide employed in the present invention is lithium nickel cobalt manganate, to thereby obtain a precipitate.

Next, the aqueous solution is filtered to collect the precipitate, and the collected precipitate is washed with water and heat-treated. Thereafter, the precipitate is mixed with the above-mentioned lithium compounds, to thereby obtain the starting material mixture.

(ii) Second Method

An aqueous solution containing cobalt ions and nickel ions of predetermined compositional ratios, which is prepared using the above-mentioned cobalt compounds and nickel compounds, is added dropwise to stirred purified water.

Then, an aqueous solution of sodium hydroxide is added dropwise so that a pH of the mixture falls within 8 to 11. The mixture is stirred at 40 to 80° C. and 500 to 1,500 rpm to precipitate cobalt and nickel, to thereby obtain salt of cobalt and nickel. Note that an alkali solution such as an aqueous solution of ammonium hydrogen carbonate, an aqueous solution of sodium hydrogen carbonate, an aqueous solution of potassium hydroxide, and an aqueous solution of lithium hydroxide can be used in place of the aqueous solution of sodium hydroxide.

Next, the aqueous solution is filtered to collect the precipitate, and the collected precipitate is washed with water and heat-treated. Thereafter, the precipitate is mixed with the above-mentioned compounds of the surface element and lithium compounds, optionally with aluminum compounds and/or manganese compounds in addition, to thereby obtain the starting material mixture.

(2) Calcination of the Starting Material Mixture and Pulverization of its Sinter Then, the starting material mixture is calcined. The temperature, time, atmosphere of calcination, and the like are not particularly limited and may be determined appropriately depending on the purpose.

The calcination temperature is preferably 650° C. or higher, more preferably 700° C. or higher, further more preferably 750° C. or higher. The calcination temperature within the above range provides sufficient characteristics as the positive electrode active material without unreacted starting material remaining in the resulting positive electrode active material.

The calcination temperature is preferably 1,200° C. or lower, more preferably 1,100° C. or lower, and further more preferably 950° C. or lower. The calcination temperature within the above range inhibits production of byproducts which may become a cause of problems such as a reduction of discharge capacity per unit weight, deterioration in cycle characteristics, and a decrease in operating voltage.

The calcination time is preferably 1 hour or more, more preferably 6 hours or more. If the calcination time is within the above range, a dispersion reaction among the mixture particles proceeds sufficiently.

The calcination time is preferably 36 hours or less, more preferably 30 hours or less. If the calcination time is within the above range, synthesis proceeds sufficiently.

Examples of the calcination atmosphere include atmospheric gas, oxygen gas, and mixed gases composed of one or more of these gases and an inert gas such as nitrogen gas or argon gas, an atmosphere is which oxygen concentration (oxygen partial pressure) is controlled, and a weakly oxidizing atmosphere.

After the calcination, the product may be optionally pulverized by use of a mortar, a ball mill, a vibration mill, a pin mill, a jet mill, or the like to pulverize the product into a predetermined specific surface area and particle size distribution.

Through the above-mentioned production method, the positive electrode active material of the present invention can be obtained. The positive electrode active material of the present invention may be suitably employed in a positive electrode mixture and a nonaqueous electrolyte secondary battery of the present invention described below.

Next, the positive electrode mixture of the present invention will be described.

The positive electrode mixture of the present invention is a positive electrode mixture containing the positive electrode active material of the present invention and a conductive agent. Further, the positive electrode mixture contains at least one selected from the group consisting of elements which may become tetravalent and magnesium, between the active material for a nonaqueous electrolyte secondary battery and the conductive agent.

According to the positive electrode mixture of the present invention, the conductive agent is not particularly limited. Examples thereof include carbon materials such as black lead (natural black lead, artificial black lead, or the like), carbon black (acetylene black or the like), and amorphous carbon (needle coke or the like).

Acetylene black and/or artificial black lead is preferable for excellent conductivity, thereby further improving the cycle characteristics and the high rate characteristics.

According to the positive electrode mixture of the present invention, "between" refers to a position between the lithium-transition metal composite oxide and the conductive agent in contact therewith.

According to the present invention, the positive electrode mixture not only refers to a paste composed of the positive electrode active material, the conductive agent, a binder, and a solvent of the binder, but also includes a state of the positive electrode active material is coated on the positive electrode current collector and dried by evaporating the solvent of the binder.

According to the positive electrode mixture of the present invention, an existing form of the surface element is not particularly limited. The surface element may exist in a form of a compound.

The production method for the positive electrode mixture of the present invention is not particularly limited. The positive electrode mixture can be produced by mixing a carbon-based conductive agent such as acetylene black and black lead, a binder, a solvent or a dispersant of the binder with powder of the positive electrode active material of the present invention, for example.

<Nonaqueous Electrolyte Secondary Battery>

The nonaqueous electrolyte secondary battery of the present invention is a nonaqueous electrolyte secondary battery employing the above-mentioned positive electrode active material of the present invention. The positive electrode active material of the present invention may be suitably employed in a nonaqueous electrolyte secondary battery such as a lithium ion secondary battery and a lithium ion polymer secondary battery.

The nonaqueous electrolyte secondary battery may just employ the positive electrode active material of the present invention as at least a part of the positive electrode active material used in a conventional nonaqueous electrolyte secondary battery, and other construction is not particularly limited. An electrolytic solution is employed for the lithium ion secondary battery, and a solid electrolyte (polymer electrolyte) is employed for the lithium ion polymer secondary battery, for example. The solid electrolytes described below may be used for the lithium ion polymer secondary battery.

Hereinafter, the nonaqueous electrolyte secondary battery will be described with the lithium ion secondary battery as an example.

Lithium manganate, in addition to the positive electrode active material of the present invention, can be used as a positive electrode active material, providing a nonaqueous electrolyte secondary battery with not only excellent high-potential characteristics, high rate characteristics and thermal stability, but also excellent overcharge characteristics and safety.

A preferable lithium manganate is represented by the general formula $Li_aMn_{3-a}O_{4+f}$ (where, $0.8 \leq a \leq 1.2$ and $-0.5 \leq f \leq 0.5$). A part of the lithium manganate may be substituted with at least one selected from the group consisting of magnesium, aluminum, calcium, vanadium, titanium, chromium, manganese, iron, cobalt, nickel, copper, zinc, strontium, zirconium, niobium, molybdenum, boron, and tin.

The following lithium-transition metal composite oxide is preferably used along with the positive electrode active material of the present invention as a positive electrode active material. That is, a preferably used lithium-transition metal composite oxide contains a primary lithium manganate and a secondary lithium manganate, in which the primary lithium manganate is smaller than the secondary lithium manganate containing boron. Such a lithium-transition metal composite oxide can provide a nonaqueous electrolyte secondary battery with not only excellent high-potential characteristics, high rate characteristics and thermal stability, but also excellent overcharge characteristics and safety and which can prevent dryout.

At least one selected from the group consisting of a carbon material capable of intercalating and deintercalating lithium metal, lithium alloys, or lithium ions and a compound capable of intercalating and deintercalating lithium ions can be used as a negative electrode active material. Examples of the lithium alloys include an LiAl alloy, an LiSn alloy, and an LiPb alloy. Examples of the carbon material capable of intercalating and deintercalating lithium ions include graphite and black lead. Examples of the compound capable of intercalating and deintercalating lithium ions include oxides such as tin oxide and titanium oxide.

The electrolytic solution is not particularly limited as long as the solution is a compound that is not denatured or decomposed at an operating voltage.

Examples of the solvent used for the electrolytic solution include organic solvents such as dimethoxyethane, diethoxyethane, ethylene carbonate, propylene carbonate, dimethyl carbonate, diethyl carbonate, ethyl methyl carbonate, methyl formate, γ-butyrolactone, 2-methyltetrahydrofuran, dimethyl sulfoxide, and sulfolane. These solvents may be used singly or two or more kinds thereof may be used in combination.

Examples of the electrolyte used as the electrolytic solution include lithium salts such as lithium perchlorate, lithium tetrafluoroborate, lithium hexafluorophosphate, and lithium trifluoromethanoate.

The above-mentioned solvent and electrolyte are mixed to prepare an electrolytic solution. Here, a gelling agent or the like may be added to the electrolytic solution in order to use the solution in a form of gel. Alternatively, the electrolytic solution may be used by being absorbed by a hygroscopic polymer. Further, inorganic or organic solid electrolytes having conductivity of lithium ions may also be used.

Examples of a separator include porous films made of polyethylene, polypropylene, or the like.

Examples of the binder include polyvinylidene fluoride, polytetrafluoroethylene, polyamide, and an acrylic resin.

The positive electrode active material of the present invention as well as the above-mentioned negative electrode active material, the electrolytic solution, the separator, and the binder can be used to produce a nonaqueous electrolyte secondary battery of the present invention according to a conventional method.

A preferable method of producing a positive electrode using the positive electrode active material of the present invention will be described hereinbelow.

Powder of the positive electrode active material of the present invention is mixed with a carbon-based conductive agent such as acetylene black or black lead, a binder, and a solvent or a dispersant of the binder, to thereby prepare a positive electrode mixture. The obtained positive electrode mixture is made into a slurry or a kneaded product and coated or carried on a current collector such as an aluminum foil, followed by press-rolling to form a layer of the positive electrode active material on the current collector.

Figure 19:
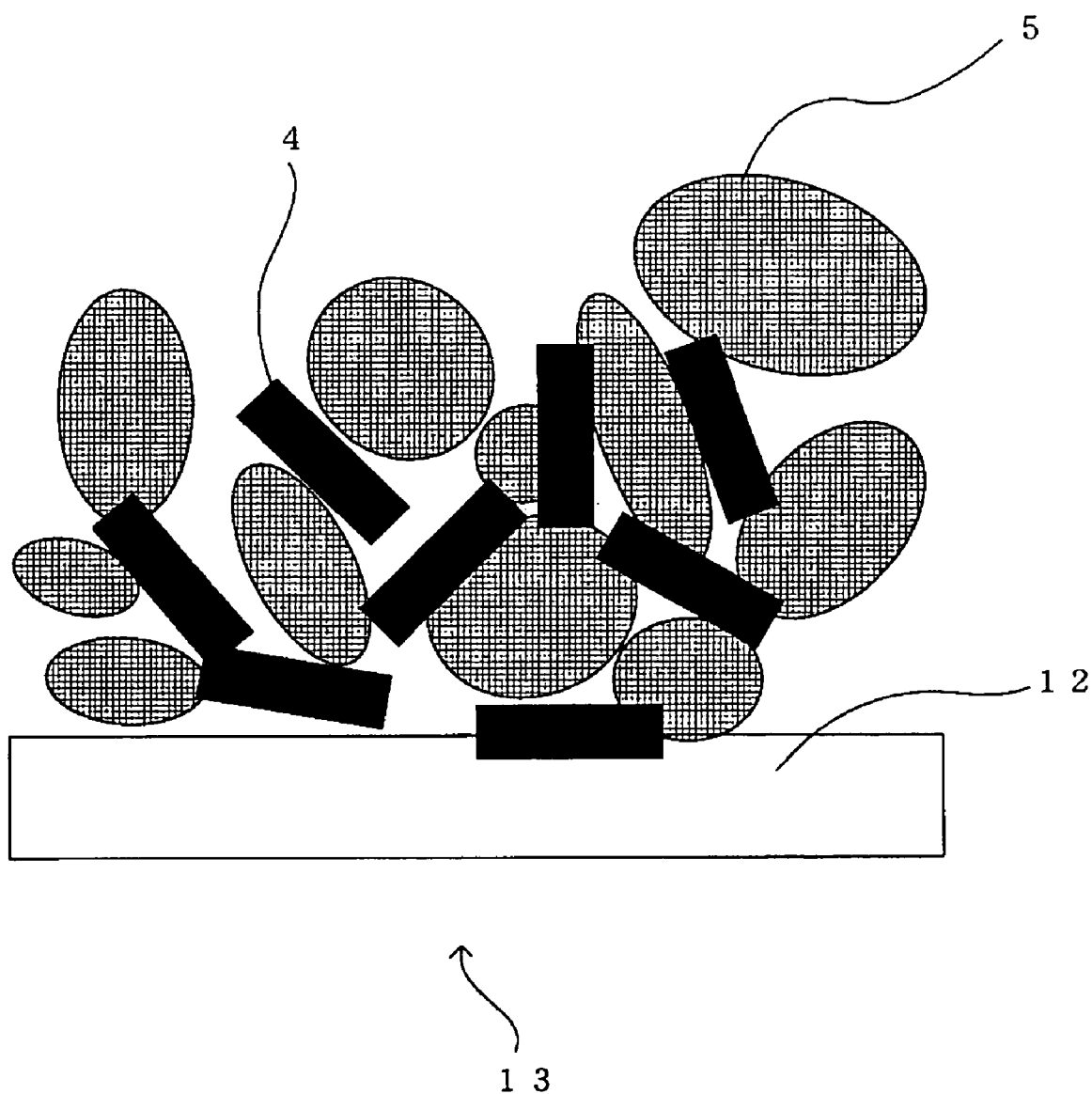
FIG. 19 is a schematic sectional view showing a positive electrode.

FIG. 19 is a schematic sectional view showing a positive electrode. FIG. 19 shows that a positive electrode 13 includes a positive electrode active material 5 held on a current collector 12 through a binder 4.

Assumedly, the positive electrode active material of the present invention has excellent miscibility with conductive agent powder, resulting in a low internal resistance of the battery. Therefore, the battery has excellent charge-discharge characteristics, in particular, excellent high rate characteristics.

Further, the positive electrode active material of the present invention has excellent flowability even when the material is kneaded with a binder, and is easily entangled with a polymer in the binder, thereby exhibiting excellent bindability.

A preferable embodiment of the nonaqueous electrolyte secondary battery of the present invention includes: a strip positive electrode constituted by forming, on at least one side (that is, may be one side or both sides) of a strip positive electrode current collector, a positive electrode active material layer employing the positive electrode active material of the present invention; a strip negative electrode constituted by forming, on at least one side of a strip negative electrode current collector, a negative electrode active material layer employing, as a negative electrode active material, one of a carbon material capable of intercalating and deintercalating lithium metal, lithium alloys, or lithium ions and a compound capable of intercalating and deintercalating lithium ions; and a strip separator, in which: the strip positive electrode and the strip negative electrode laminated with the strip separator between them are wound plural times to form a web of the strip positive electrode and the strip negative electrode with the strip separator intervening between them.

Such a nonaqueous electrolyte secondary battery involves simple production steps and suppresses forming of cracks in the positive electrode active material layer and the negative electrode active material layer and peeling thereof from the strip separator. Further, the nonaqueous electrolyte secondary battery has a large battery capacity and a high energy density. The positive electrode active material of the present invention, in particular, has excellent filling ability and easily conforms to the binder. Therefore, the positive electrode active material provides a positive electrode with high charge-discharge capacity, excellent bindability, and excellent surface smoothness, capable of preventing cracks or peeling of the positive electrode active material layer.

Further, a nonaqueous electrolyte secondary battery having even higher charge-discharge capacity without deteriorating the battery characteristics of the present invention can be provided by forming the positive electrode active material layer employing the positive electrode active material of the present invention on both sides of the strip positive electrode current collector and by forming the negative electrode active material layer employing the negative electrode active material on both sides of the strip negative electrode current collector.

Further, another preferable embodiment of the nonaqueous electrolyte secondary battery of the present invention includes a positive electrode, a negative electrode, a separator, and a nonaqueous electrolyte in which the following I is used as a positive electrode active material of the positive electrode and the following II is used as a negative electrode active material of the negative electrode. The nonaqueous electrolyte secondary battery exhibits not only excellent high rate characteristics, low-temperature characteristics, power characteristics, and thermal stability, but also excellent overcharge characteristics and safety.

I: Positive electrode active material for a nonaqueous electrolyte secondary battery prepared by mixing lithium manganate represented by the general formula $Li_aMn_{3-a}O_{4+f}$ (where, $0.8 \leq a \leq 1.2$ and $-0.5 \leq f \leq 0.5$) and the lithium-transition metal composite oxide employed in the positive electrode active material of the present invention within the range of $0.2 \leq B/(A+B) \leq 0.8$ (where, A represents weight of the lithium manganate and B represents weight of the lithium-transition metal composite oxide).

II: Negative electrode active material composed of at least one selected from the group consisting of a carbon material capable of intercalating and deintercalating lithium metal, lithium alloys, and lithium ions and a compound capable of intercalating and deintercalating lithium ions.

According to the positive electrode active material of above I, the compounds are preferably mixed within the range of $0.4 \leq B/(A+B) \leq 0.6$. The compounds mixed within the range of $0.4 \leq B/(A+B) \leq 0.6$ provide a nonaqueous electrolyte secondary battery with not only significantly improved high rate characteristics, low-temperature characteristics, power characteristics, and thermal stability, but also significantly improved overcharge characteristics and safety.

According to the positive electrode active material of above I, a part of the lithium manganate may be substituted with at least one selected from the group consisting of magnesium, aluminum, calcium, vanadium, titanium, chromium, manganese, iron, cobalt, nickel, copper, zinc, strontium, zirconium, niobium, molybdenum, boron, and tin.

Lithium manganate is a positive electrode active material for a nonaqueous electrolyte secondary battery containing at least a lithium-transition metal composite oxide of a spinel structure. Preferable embodiments of the lithium-transition metal composite oxide include the following (i) to (vii). [0104](3)

(i) An embodiment in which the lithium-transition metal composite oxide is represented by the general formula $Li_{1+a}Mg_bTi_cMn_{2-a-b-c}B_dO_{4+e}$, (where, $-0.2<a \leq 0.2$, $0.005 \leq b \leq 0.10$, $0.005 \leq c \leq 0.05$, $0.002 \leq d \leq 0.02$, and $-0.5 \leq e \leq 0.5$).

The embodiment (i) exhibits excellent cycle characteristics, high-temperature cycle characteristics, and high rate characteristics.

According to the embodiment (i), a is preferably larger than 0. It is assumed that substitution of a part of manganese with lithium may improve the cycle characteristics.

According to the embodiment (i), b is preferably 0.01 or larger, more preferably 0.02 or larger. Further, b is preferably 0.08 or smaller, more preferably 0.07 or smaller. Too large b decreases trivalent manganese ions, thereby reducing the charge-discharge capacity. Too small b increases elution of transition metal ions and causes gas generation, thereby deteriorating the high-temperature characteristics.

According to the embodiment (i), c is preferably 0.01 or larger, more preferably 0.02 or larger. Further, c is preferably 0.08 or smaller, more preferably 0.07 or smaller. Too large c decreases the charge-discharge efficiency. Too small c does not provide sufficient high rate characteristics and cycle characteristics.

According to the embodiment (i), d is preferably 0.003 or larger and is preferably 0.008 or smaller. Too large d decreases an initial capacity. Further, the elution of the transition metal ions increases and gas generation is invoked, thereby deteriorating the high-temperature characteristics. Too small d inhibits growth of primary particle size, thereby not improving the filling ability of the particles.

(ii) An embodiment in which the lithium-transition metal composite oxide is lithium manganese composite oxide containing at least one selected from the group consisting of titanium, zirconium, and hafnium.

Assumedly, the inclusion of at least one selected from the group consisting of titanium, zirconium, and hafnium increases lattice constants of a unit lattice of lithium manganese composite oxide particles and increases mobility of the lithium ions in the particles, allowing reduction of impedance. Thus, the power characteristics improve without hindering improvements in the cycle characteristics and the high-temperature cycle characteristics.

(iii) An embodiment in which the lithium-transition metal composite oxide is lithium manganese composite oxide containing: at least one selected from the group consisting of titanium, zirconium, and hafnium; and sulfur.

According to the embodiment (iii), it is assumed that electron passage improves due to existence of sulfur, thereby further improving the cycle characteristics and the high rate characteristics.

The sulfur content is preferably 0.03 to 0.3 wt % with respect to the total of lithium-transition metal composite oxide and sulfur. If the sulfur content is smaller than 0.03 wt %, resistance to electron migration may be hardly reduced. If the sulfur content is larger than 0.3 wt %, the battery may swell from moisture adsorption.

Sulfur may exist in any form. Sulfur may exist in a form of a sulfate group, for example.

The sulfate group includes a sulfate ion, a cluster of atoms of the sulfate ion with electrons removed, and a sulfo group. The sulfate group is preferably based on at least one selected from the group consisting of alkali metal sulfates, alkali earth metal sulfates, organic sulfates, organic sulfonic acids, and organic sulfonates.

Of those, the sulfate group is preferably based on at least one selected from the group consisting of alkali metal sulfates and alkali earth metal sulfates, and is more preferably based on alkali metal sulfates. The reason is that alkali metal sulfates are formed by bonding of a strong acid and a strong base and are chemically stable.

According to the embodiment (iii), reasons for the inclusion of elements in addition to sulfur is the same as in the embodiment (ii).

According to the embodiment (iii), a synergistic effect of respective elements included provides a positive electrode plate with high charge-discharge capacity, as well as excellent bindability and surface smoothness.

The lithium-transition metal composite oxide may contain a sulfate group on at least the particle surface.

It is assumed that the existence of the sulfate group on the particle surface of the lithium-transition metal composite oxide significantly reduces resistance to electron migration in the vicinity of particles, thereby possibly improving the electron passage, the cycle characteristics, and the high rate characteristics.

Further, assumedly, a high-voltage battery employing the positive electrode active material of the present invention (battery employing $LiMn_{1.5}Ni_{0.5}O_4$ for the lithium-transition metal composite oxide, for example) suppresses decomposition of the electrolyte during charge, which was a problem in conventional high-voltage batteries, thereby improving the cycle characteristics. The decomposition reaction of the electrolyte supposedly occurs at an interface between the lithium-transition metal composite oxide and the electrolyte with the lithium-transition metal composite oxide serving as a catalyst. Covering the entire or a part of the particle surface of the lithium-transition metal composite oxide with the sulfate group, which has no function of decomposing the electrolyte, reduces a contact area of the electrolyte and the catalyst, thereby suppressing the decomposition reaction.

According to the present invention, the sulfate group existing on the particle surface of lithium-transition metal composite oxide in any form exhibits effect of the present invention. The cycle characteristics and the high rate characteristics improve even when the sulfate group covers the entire particle surface of the lithium-transition metal composite oxide or even when the sulfate group covers a part of the particle surface of the lithium-transition metal composite oxide.

Further, the sulfate group may just exist on at least the particle surface. Therefore, a part of the sulfate group may exist inside the particles.

Existence of the sulfate group on the particle surface of the lithium-transition metal composite oxide can be analyzed through various methods. Examples of the methods include Auger electron spectroscopy and X-ray photoelectron spectroscopy.

Further, the amount of the sulfate group can be determined through various methods. Examples of the methods include inductively coupled plasma spectrometry and a titration method.

(iv) An embodiment in which the lithium-transition metal composite oxide is lithium manganese composite oxide containing: at least one selected from the group consisting of titanium, zirconium, and hafnium; sulfur; and sodium and/or calcium.

According to the embodiment (iv), the inclusion of sodium and/or calcium further suppresses the elution of manganese ions owing to the synergistic effect with boron (preferably boron and sulfur), so that excellent cycle characteristics of a battery can be realized on a practically acceptable level.

According to the embodiment (iv), the reason for the inclusion of elements in addition to sodium and/or calcium is the same as that in the embodiments (ii) and (iii).

(v) An embodiment in which the lithium-transition metal composite oxide is lithium manganese composite oxide containing aluminum and/or magnesium.

The inclusion of aluminum and/or magnesium stabilizes the crystal structure of the composite oxide, provides excellent cycle characteristics without deteriorating the storage characteristics, the high rate characteristics, and the power characteristics, and further suppresses the swelling of the battery.

(vi) An embodiment in which the lithium-transition metal composite oxide is lithium manganese composite oxide containing aluminum and/or magnesium and boron.

Boron serves as a flux to accelerate crystal growth, and in addition, improves the cycle characteristics and storage characteristics.

(vii) An embodiment in which the lithium-transition metal composite oxide is represented by the general formula $Li_{1+a}M_bMn_{2-a-b}B_cO_{4+d}$, (where, M represents aluminum and/or magnesium, $-0.2 \leq a \leq 0.2$, $0 \leq b \leq 0.2$, $0 \leq c \leq 0.02$, and $-0.5 \leq d \leq 0.5$)

The embodiment (vii) provides excellent cycle characteristics, high rate characteristics, storage characteristics, and charge-discharge capacity and exhibits less swelling of the battery.

According to the embodiment (vii), a is preferably larger than 0. It is assumed that substitution of a part of manganese with lithium may improve the cycle characteristics.

According to the embodiment (vii), b is preferably larger than 0, more preferably 0.05 or larger. The inclusion of aluminum and/or magnesium stabilizes the crystal structure of the composite oxide, provides excellent cycle characteristics without deteriorating the storage characteristics, the high rate characteristics, and the power characteristics, and further suppresses the swelling of the battery. b is preferably 0.15 or smaller. Too large b reduces the charge-discharge capacity.

According to the embodiment (vii), c is preferably larger than 0, more preferably 0.001 or larger. Boron serves as a flux to accelerate crystal growth, and in addition, improves the cycle characteristics and the storage characteristics. Further, c is preferably 0.01 or smaller. Too large c deteriorates the cycle characteristics.

The production method for lithium manganate employed along with the positive electrode active material of the present invention is not particularly limited, and lithium manganate can be produced through the following, for example.

Compounds are mixed such that each constituent element exists in a predetermined compositional ratio, to thereby obtain a starting material mixture. The compounds used for preparing the starting material mixture are selected depending on the elements that constitute the target composition.

A mixing method is not particularly limited, and examples thereof include: a method in which powdery compounds are mixed as they are to obtain a starting material mixture; a method in which the compounds are mixed using water and/or an organic solvent to form a slurry, and then dried to obtain a starting material mixture; a method in which aqueous solutions of the above-mentioned compounds are mixed to form a precipitate, which then is dried to obtain a starting material mixture; and a method using those methods in combination.

Then, the starting material mixture is calcined. The temperature, time, atmosphere of calcination, and the like are not particularly limited and may be determined appropriately depending on the purpose.

After the calcination, the product may be optionally pulverized by use of a mortar, a ball mill, a vibration mill, a pin mill, a jet mill, or the like to pulverize the product into a predetermined particle size.

The compound capable of intercalating and deintercalating lithium ions used for the negative electrode active material of the above II is preferably a negative electrode active material for a nonaqueous electrolyte secondary battery represented by the general formula $Li_aTi_bO_{4+c}$ (where, $0.8 \leq a \leq 1.5$, $1.5 \leq b \leq 2.2$, and $-0.5 \leq c \leq 0.5$), which has a spinel structure containing an alkali metal and/or an alkali earth metal. Here, a nonaqueous electrolyte secondary battery can be provided with extremely improved high rate characteristics, low-temperature characteristics, power characteristics, thermal stability, as well as cycle characteristics.

A shape of the nonaqueous electrolyte secondary battery of the present invention is not particularly limited and may be in a form of a cylinder, a coin, a square, a laminate, or the like.

Figure 20:
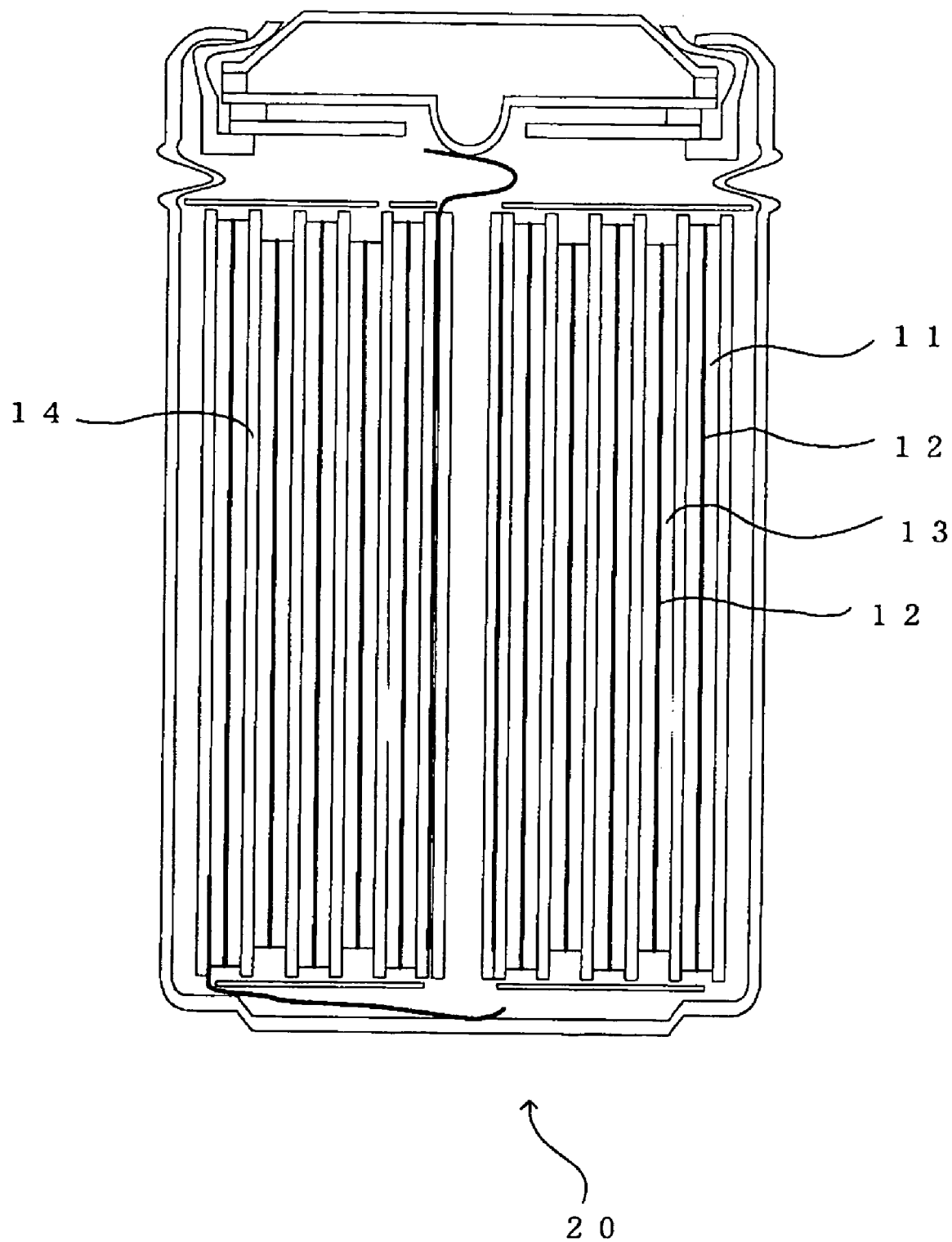
FIG. 20 is a schematic sectional view showing a cylinder type battery.

FIG. 20 is a schematic sectional view showing a cylinder type battery. FIG. 20 shows in a cylinder type battery 20, positive electrodes 13, made up of layers of a positive electrode active material formed on current collectors 12, and negative electrodes 11, made up of layers of a negative electrode active material formed on current collectors 12, alternately laminated on one another with separators 14 intervening between them.

Figure 21:
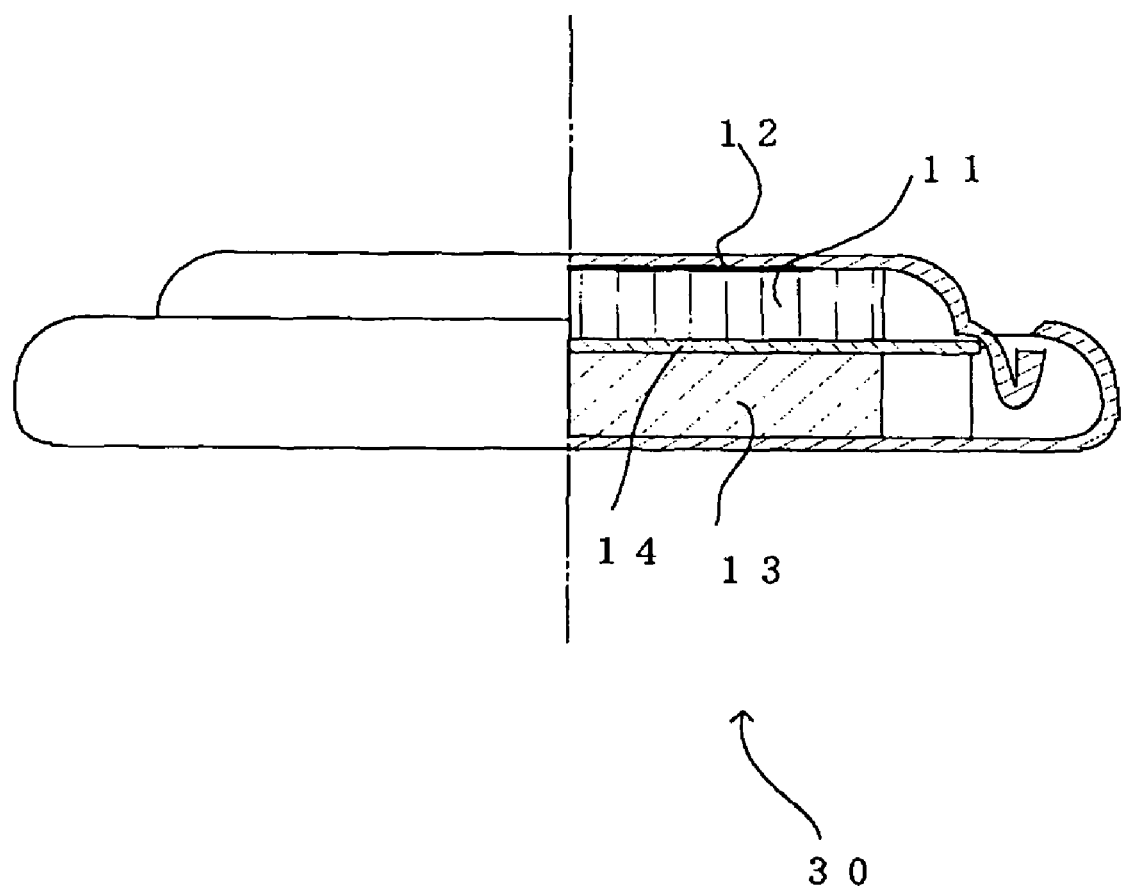
FIG. 21 is a schematic fragmentary sectional view showing a coin type battery.

FIG. 21 is a schematic fragmentary sectional view showing a coin type battery. FIG. 21 shows in a coin type battery 30, a positive electrode 13, made up of a layer of a positive electrode active material formed on current collectors 12, and a negative electrode 11 laminated through a separator 14.

Figure 22:
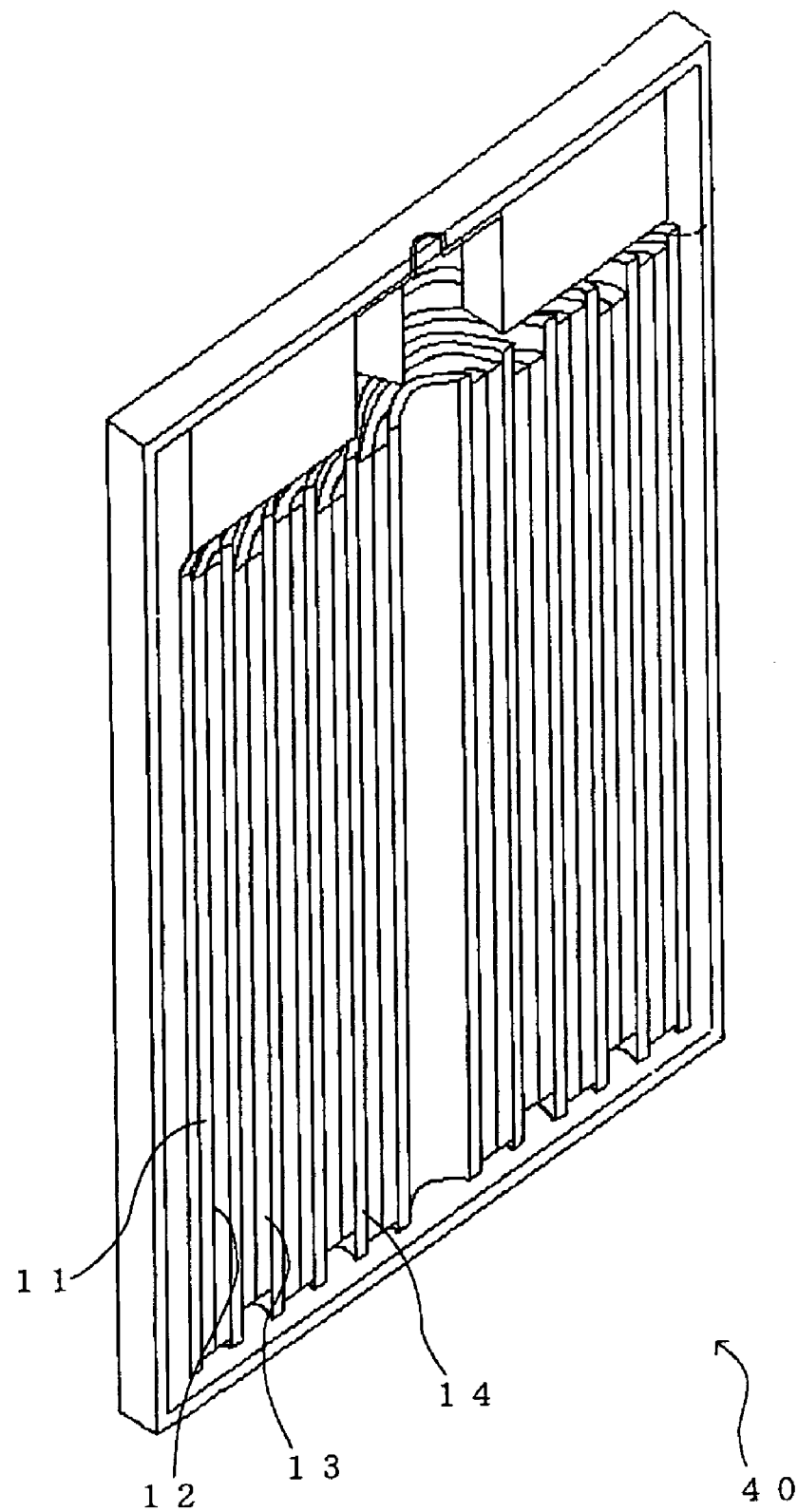
FIG. 22 is a schematic sectional perspective view showing a square type battery.

FIG. 22 is a schematic perspective view showing a square type battery. FIG. 22 shows in a square type battery 40, positive electrodes 13, made up of layers of a positive electrode active material formed on current collectors 12, and negative electrodes 11 made up of layers of a negative electrode active material formed on current collectors 12 alternately laminated on one another with separators 14 intervening between them.

<Applications of Nonaqueous Electrolyte Secondary Battery>

Applications of the nonaqueous electrolyte secondary battery that employs the positive electrode active material of the present invention are not particularly limited. Examples of the applications include power supplies for equipment such as laptop personal computers, pen-input personal computers, pocket personal computers, laptop word processors, pocket word processors, electronic book players, cellular phones, cordless phone, electronic notebooks, calculators, liquid crystal televisions, electric shavers, electrically powered tools, electronic translation machines, automobile telephones, mobile printers, transceivers, pagers, handy terminals, mobile copiers, audio input equipment, memory cards, backup power supplies, tape recorders, radios, headphone stereos, handy cleaners, portable compact disk (CD) players, video movies, and navigation systems.

Further examples of the applications of the battery include power supplies for illuminating equipment, air-conditioners, televisions, stereos, water heaters, refrigerators, microwave ovens, dish washers, washing machines, driers, game equipment, toys, load conditioners, medical equipment, automobiles, electric automobiles, golf carts, electrically powered carts, and electrical power storage systems.

Further, the applications of the battery are not limited to social applications and may be used for military or in space applications.

This application claims priority on Japanese patent applications No.2003-83806, No.2003-282341, No.2003-358885 and No.2003-432856, the contents of which are hereby incorporated by reference.

EXAMPLES

Hereinafter, the present invention will be described in more detail by way of examples. However, the present invention is not limited thereto.

1. Preparation of Positive Electrode Active Material

Example 1-1

An aqueous solution of cobalt sulfate and an aqueous solution of zirconium oxychloride were added dropwise to stirred purified water in a predetermined compositional ratio. At that time, the aqueous solution of zirconium oxychloride was added dropwise so that zirconium accounted for 0.2 mol % with respect to cobalt. Further, an aqueous solution of sodium hydroxide was added dropwise so that a pH of the mixture fell within 7 to 7.5. The mixture was stirred at 60° C. and 650 rpm to precipitate cobalt and zirconium, to obtain a precipitated product. The obtained precipitated product was filtered, washed with water, and heat-treated. Thereafter, the precipitated product was mixed with lithium carbonate and calcined in air at 995° C. for 7 hours, to thereby obtain a positive electrode active material.

Example 1-2

An aqueous solution of cobalt sulfate and an aqueous solution of zirconium oxychloride were added dropwise to stirred purified water in a predetermined compositional ratio. At that time, the aqueous solution of zirconium oxychloride was added dropwise so that zirconium accounted for 0.04 mol % with respect to cobalt. Further, an aqueous solution of sodium hydroxide was added dropwise so that a pH of the mixture fell within 7 to 7.5. The mixture was stirred at 60° C. and 650 rpm to precipitate cobalt and zirconium, to obtain a precipitated product. The obtained precipitated product was filtered, washed with water, and heat-treated. Thereafter, the precipitated product was mixed with lithium carbonate and calcined in air at 995° C. for 7 hours, to thereby obtain a positive electrode active material.

Example 1-3

An aqueous solution containing cobalt and nickel was added dropwise to stirred purified water in a predetermined compositional ratio. Further, an aqueous solution of sodium hydroxide was added dropwise so that a pH of the mixture was 9. The mixture was stirred at 80° C. and 650 rpm to precipitate cobalt and nickel, to obtain a precipitated product. The obtained precipitated product was filtered, washed with water, and heat-treated. Thereafter, the precipitated product was mixed with zirconium oxide and lithium hydroxide and calcined in an atmosphere with controlled oxygen partial pressure at about 750° C. for about 10 hours, to thereby obtain a positive electrode active material. Zirconium included in zirconium oxide was 0.03 mol % with respect to the precipitated product.

Comparative Example 1-1

Lithium carbonate ($Li_2CO_3$), cobalt tetraoxide ($CO_3O_4$), and zirconium oxide ($ZrO_2$) were used as compounds of starting materials. The compounds of the starting materials were weighed in a predetermined compositional ratio and mixed by a dry method to prepare starting material powder. The obtained starting material powder was calcined in air at 995° C. for 7 hours, to thereby obtain a positive electrode active material.

Comparative Example 1-2

An aqueous solution of cobalt sulfate was added dropwise to stirred purified water in a predetermined compositional ratio. Here, an aqueous solution of sodium hydroxide was added dropwise so that a pH of the mixture was 7. The mixture was stirred at 60° C. and 650 rpm to precipitate cobalt, to obtain a precipitated product. The obtained precipitated product was filtered, washed with water, and heat-treated. Thereafter, the precipitated product was mixed with lithium carbonate and calcined in air at 1,045° C. for 7 hours, to thereby obtain a positive electrode active material.

Comparative Example 1-3

An aqueous solution containing cobalt and nickel was added dropwise to stirred purified water in a predetermined compositional ratio. Further, an aqueous solution of sodium hydroxide was added dropwise so that a pH of the mixture was 9. The mixture was stirred at 80° C. and 650 rpm to precipitate cobalt and nickel, to obtain a precipitated product. The obtained precipitated product was filtered, washed with water, and heat-treated. Thereafter, the precipitated product was mixed with lithium hydroxide and calcined in an atmosphere with controlled oxygen partial pressure at about 750° C. for about 10 hours, to thereby obtain a positive electrode active material.

Example 2-1

An aqueous solution of cobalt sulfate and an aqueous solution of magnesium sulfate were added dropwise to stirred purified water in a predetermined compositional ratio. At that time, the aqueous solution of magnesium sulfate was added dropwise so that magnesium accounted for 2 mol % with respect to cobalt. Further, an aqueous solution of sodium hydroxide was added dropwise so that a pH of the mixture was 7. The mixture was stirred at 60° C. and 650 rpm to precipitate cobalt and magnesium, to obtain a precipitated product. The obtained precipitated product was filtered, washed with water, and heat-treated. Thereafter, the precipitated product was mixed with lithium carbonate and calcined in air at 995° C. for 7 hours, to thereby obtain a positive electrode active material.

Example 2-2

A positive electrode active material was obtained in the same manner as in Example 2-1 except that the aqueous solution of magnesium sulfate was added dropwise so that magnesium accounted for 4 mol % with respect to cobalt.

Comparative Example 2-1

Lithium carbonate ($Li_2CO_3$), cobalt tetraoxide ($Co_3O_4$), and magnesium oxide (MgO) were used as compounds of starting materials. The compounds of the starting materials were weighed in a predetermined compositional ratio and mixed by a dry method to prepare starting material powder. 2 mol % of magnesium oxide was mixed with respect to cobalt. The obtained staring material powder was calcined in air at 995° C. for 7 hours, to thereby obtain a positive electrode active material.

Example 3-1

An aqueous solution of cobalt sulfate and an aqueous solution of titanium sulfate were added dropwise to stirred purified water in a predetermined compositional ratio. At this time, the aqueous solution of titanium sulfate was added dropwise so that titanium accounted for 0.2 mol % with respect to cobalt. Further, an aqueous solution of sodium hydroxide was added dropwise so that a pH of the mixture was 7. The mixture was stirred at 60° C. and 650 rpm to precipitate cobalt and titanium, to obtain a precipitated product. The obtained precipitated product was filtered, washed with water, and heat-treated. Thereafter, the precipitated product was mixed with lithium carbonate and calcined in air at 995° C. for 7 hours, to thereby obtain a positive electrode active material.

A compositional ratio of the obtained positive electrode active material was Li:Co:Ti=1.0:0.998:0.002.

Comparative Example 3-1

Lithium carbonate ($Li_2CO_3$), cobalt tetraoxide ($Co_3O_4$), and titanium oxide ($TiO_2$) were used as compounds of starting materials. The compounds of the starting materials were weighed in a predetermined compositional ratio and mixed by a dry method to prepare starting material powder. At that time, 0.1 mol % of titanium oxide was mixed with respect to cobalt. The obtained staring material powder was calcined in air at 950° C. for 7 hours, to thereby obtain a positive electrode active material.

A compositional ratio of the obtained positive electrode active material was Li:Co:Ti=1.0:0.999:0.001.

Comparative Example 3-2

Lithium carbonate ($Li_2CO_3$) and cobalt tetraoxide ($Co_3O_4$), were used as compounds of starting materials. The compounds of the starting materials were weighed in a predetermined compositional ratio and mixed by a dry method to prepare starting material powder. The obtained staring material powder was calcined in air at 995° C. for 7 hours, to thereby obtain a positive electrode active material.

A compositional ratio of the obtained positive electrode active material was Li:Co=1.0:1.0.

Example 4-1

An aqueous solution of cobalt sulfate, an aqueous solution of zirconium oxychloride, and an aqueous solution of magnesium sulfate were added dropwise to stirred purified water in a predetermined compositional ratio. At this time, the aqueous solution of zirconium oxychloride was added dropwise so that zirconium accounted for 0.5 mol % with respect to cobalt, and the aqueous solution of magnesium sulfate was added dropwise so that magnesium accounted for 0.5 mol % with respect to cobalt. Here, an aqueous solution of sodium hydroxide was added dropwise so that a pH of the mixture was 7. The mixture was stirred at 60° C. and 650 rpm to precipitate cobalt, zirconium, and magnesium, to obtain a precipitated product. The obtained precipitated product was filtered, washed with water, and heat-treated. Thereafter, the precipitated product was mixed with lithium carbonate and calcined in air at 1,060° C. for 7 hours, to thereby obtain a positive electrode active material.

A compositional ratio of the obtained positive electrode active material was Li:Co:Zr:Mg=1.0:0.990:0.005:0.005.

Example 4-2

An aqueous solution of cobalt sulfate, an aqueous solution of zirconium oxychloride, an aqueous solution of magnesium sulfate, and an aqueous solution of aluminum sulfate were added dropwise to stirred purified water in a predetermined compositional ratio. At this time, the aqueous solution of zirconium oxychloride was added dropwise so that zirconium accounted for 0.04 mol % with respect to cobalt, the aqueous solution of magnesium sulfate was added dropwise so that magnesium accounted for 1.0 mol % with respect to cobalt, and the aqueous solution of aluminum sulfate was added dropwise so that aluminum accounted for 1.0 mol % with respect to cobalt. Here, an aqueous solution of sodium hydroxide was added dropwise so that a pH of the mixture was 7. The mixture was stirred at 60° C. and 650 rpm to precipitate cobalt, zirconium, magnesium, and aluminum to obtain a precipitated product. The obtained precipitated product was filtered, washed with water, and heat-treated. Thereafter, the precipitated product was mixed with lithium carbonate and calcined in air at 1,045° C. for 7 hours, to thereby obtain a positive electrode active material.

A compositional ratio of the obtained positive electrode active material was Li:Co:Zr:Mg:Al=1.0:0.9796:0.0004: 0.01:0.01.

Example 1-4

An aqueous solution of cobalt sulfate and an aqueous solution of zirconium oxychloride were added dropwise to stirred purified water in a predetermined compositional ratio. At this time, the aqueous solution of zirconium oxychloride was added dropwise so that zirconium accounted for 0.5 mol % with respect to cobalt. Here, an aqueous solution of sodium hydroxide was added dropwise so that a pH of the mixture was 7. The mixture was stirred at 60° C. and 650 rpm to precipitate cobalt and zirconium, to obtain a precipitated product. The obtained precipitated product was filtered, washed with water, and heat-treated. Thereafter, the precipitated product was mixed with lithium carbonate and magnesium hydroxide and calcined in air at 995° C. for 7 hours, to thereby obtain a positive electrode active material. At that time, 0.5 mol % of magnesium hydroxide was mixed with respect to cobalt.

A compositional ratio of the obtained positive electrode active material was Li:Co:Zr:Mg=1.0:0.990:0.005:0.005.

Example 1-5

An aqueous solution of cobalt sulfate and an aqueous solution of zirconium oxychloride were added dropwise to stirred purified water in a predetermined compositional ratio. At this time, the aqueous solution of zirconium oxychloride was added dropwise so that zirconium accounted for 0.5 mol % with respect to cobalt. Here, an aqueous solution of sodium hydroxide was added dropwise so that a pH of the mixture was 7. The mixture was stirred at 60° C. and 650 rpm to precipitate cobalt and zirconium, to obtain a precipitated product. The obtained precipitated product was filtered, washed with water, and heat-treated. Thereafter, the precipitated product was mixed with lithium carbonate and magnesium hydroxide and calcined in air at 995° C. for 7 hours, to thereby obtain a positive electrode active material. At that time, 0.5 mol % of magnesium hydroxide was mixed with respect to cobalt.

A compositional ratio of the obtained positive electrode active material was Li:Co:Zr:Mg=1.0:0.985:0.005:0.01.

Comparative Example 4-1

An aqueous solution of cobalt sulfate was added dropwise to stirred purified water in a predetermined compositional ratio. Here, an aqueous solution of sodium hydroxide was added dropwise-so that a pH of the mixture was 7. The mixture was stirred at 60° C. and 650 rpm to precipitate cobalt, to obtain a precipitated product. The obtained precipitated product was filtered, washed with water, and heat-treated. Thereafter, the precipitated product was mixed with lithium carbonate and calcined in air at 1,045° C. for 7 hours, to thereby obtain a positive electrode active material.

A compositional ratio of the obtained positive electrode active material was Li:Co =1.0:1.0.

2. Properties of Positive Electrode Active Material (1) Constitution of Positive Electrode Active Material ICP spectroscopy was performed on the positive electrode active materials obtained in Examples 1-1, 1-2, 1-3, 2-1, 2-2, 3-1, 4-1, 4-2, 1-4, and 1-5 as well as Comparative Examples 1-1, 1-2, 1-3, 2-1, 3-1, 3-2, and 4-1.

The positive electrode active material obtained in Example 1-1 was $LiCoO_2$ containing 0.2 mol % zirconium. XPS results indicated that Zr exists on a surface of the positive electrode active material obtained in Example 1-1. EPMA results showed that Zr exists uniformly on the surface of the positive electrode active material obtained in Example 1-1. An existence ratio of Zr on the particle surface was 98.3%.

The positive electrode active material obtained in Example 1-2 was $LiCoO_2$ containing 0.04 mol % zirconium. The XPS results indicated that Zr exists on the surface of the positive electrode active material obtained in Example 1-2. The EPMA results showed that Zr exists uniformly on the surface of the positive electrode active material obtained in Example 1-2. The existence ratio of Zr on the particle surface was in the range of 20% or more.

The positive electrode active material obtained in Example 1-3 was $LiNi_{0.79}Co_{0.21}O_2$ containing 0.03 mol % zirconium with respect to lithium nickel cobaltate composite oxide. XRD (X-ray diffraction analysis) results indicated that Zr exists on the surface of the positive electrode active material obtained in Example 1-3.

The positive electrode active material obtained in Comparative Example 1-1 was $LiCoO_2$ containing 0.2 mol % zirconium. The EPMA results indicated that Zr was greatly segregated on the surface of the positive electrode active material obtained in Comparative Example 1-1. The existence ratio of Zr on the particle surface was 12.8%.

The positive electrode active material obtained in Comparative Example 1-2 was $LiCoO_2$.

The positive electrode active material obtained in Comparative Example 1-3 was $LiNi_{0.79}Co_{0.21}O_2$.

Figure 1:
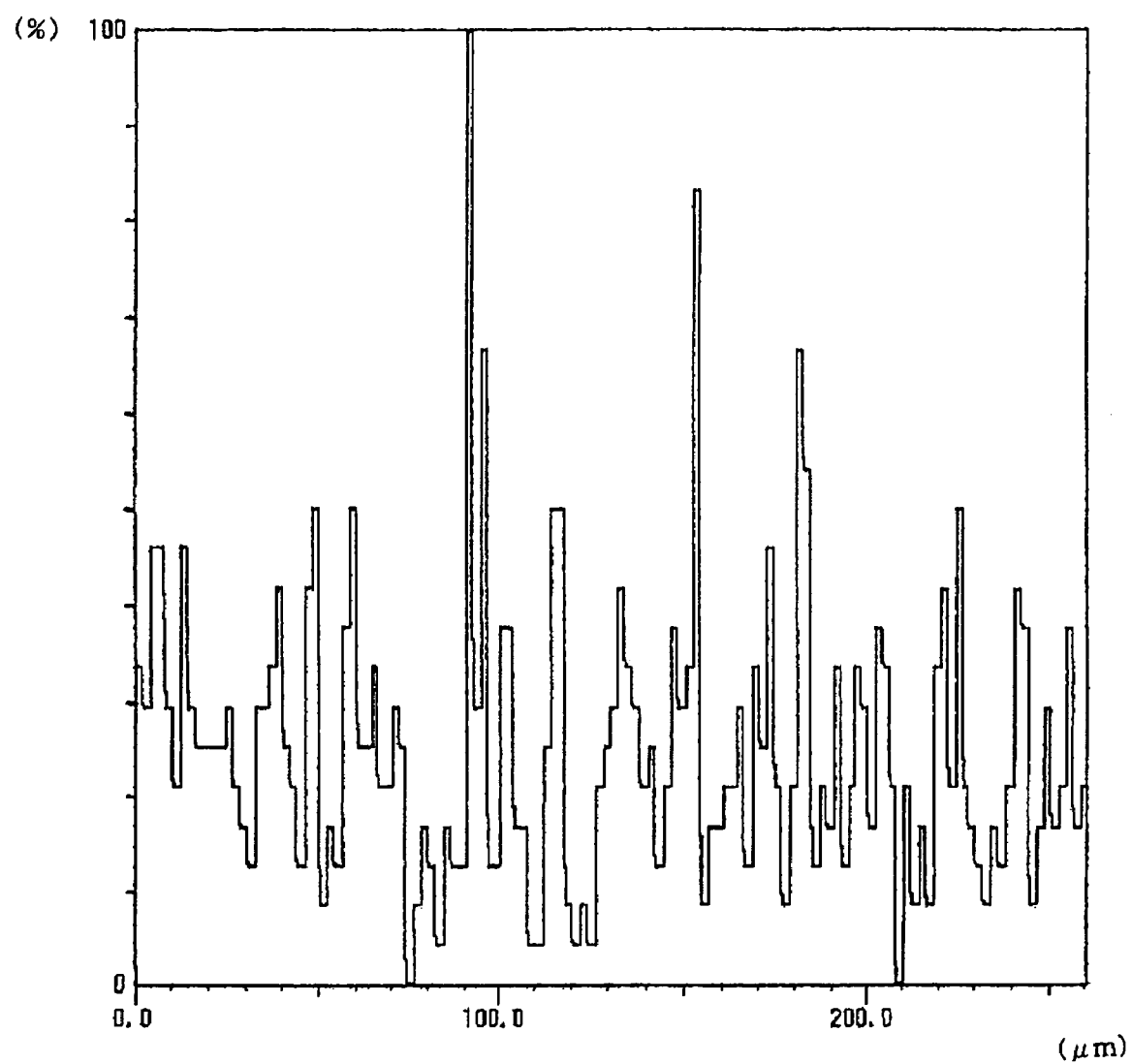
FIG. 1 is a diagram showing a result of line analysis on a lithium-transition metal composite oxide in Example 1-1 for 2 points within a distance of 260 μm using EPMA.

FIG. 1 shows results of line analysis on the lithium-transition metal composite oxide obtained in Example 1-1 for two points within a line segment of 260 μm using EPMA. FIG. 1 shows that the lithium-transition metal composite oxide in Example 1-1 had zirconium uniformly dispersed on the particle surface thereof with little segregation.

Figure 2:
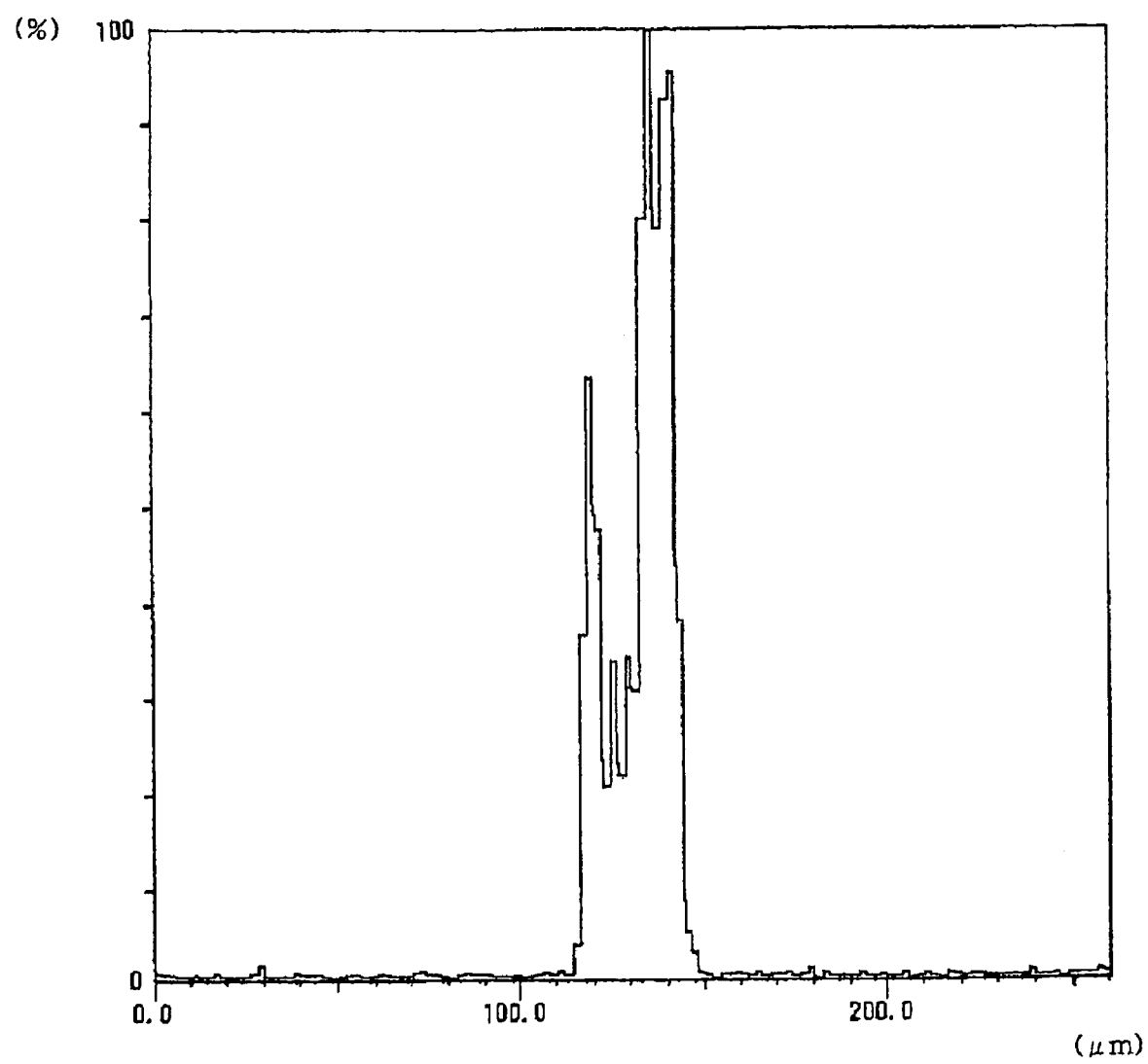
FIG. 2 is a diagram showing a result of line analysis on a lithium-transition metal composite oxide in Comparative Example 1-1 for 2 points within a distance of 260 μm using EPMA.

FIG. 2 shows results of line analysis on the lithium-transition metal composite oxide obtained in Comparative Example 1-1 for two points within a line segment of 260 μm using EPMA. FIG. 2 shows that zirconium hardly existed, or was segregated even if present on the particle surface of the lithium-transition metal composite oxide in Comparative Example 1-1.

The positive electrode active material obtained in Example 2-1 was $LiCoO_2$ containing 2 mol % magnesium. The EPMA results indicated that magnesium exists uniformly on the surface of the positive electrode active material obtained in Example 2-1. The existence ratio of magnesium on the particle surface was 56%.

The positive electrode active material obtained in Example 2-2 was $LiCoO_2$ containing 4 mol % magnesium. The EPMA results indicated that magnesium existed uniformly on the surface of the positive electrode active material obtained in Example 2-2. The existence ratio of magnesium on the particle surface was in the range of 20% or more.

The positive electrode active material obtained in Comparative Example 2-1 was $LiCoO_2$ containing 2 mol % magnesium. The EPMA results indicated that magnesium was greatly segregated on the surface of the positive electrode active material obtained in Comparative Example 2-1. The existence ratio of magnesium on the particle surface was 3%.

Figure 3:
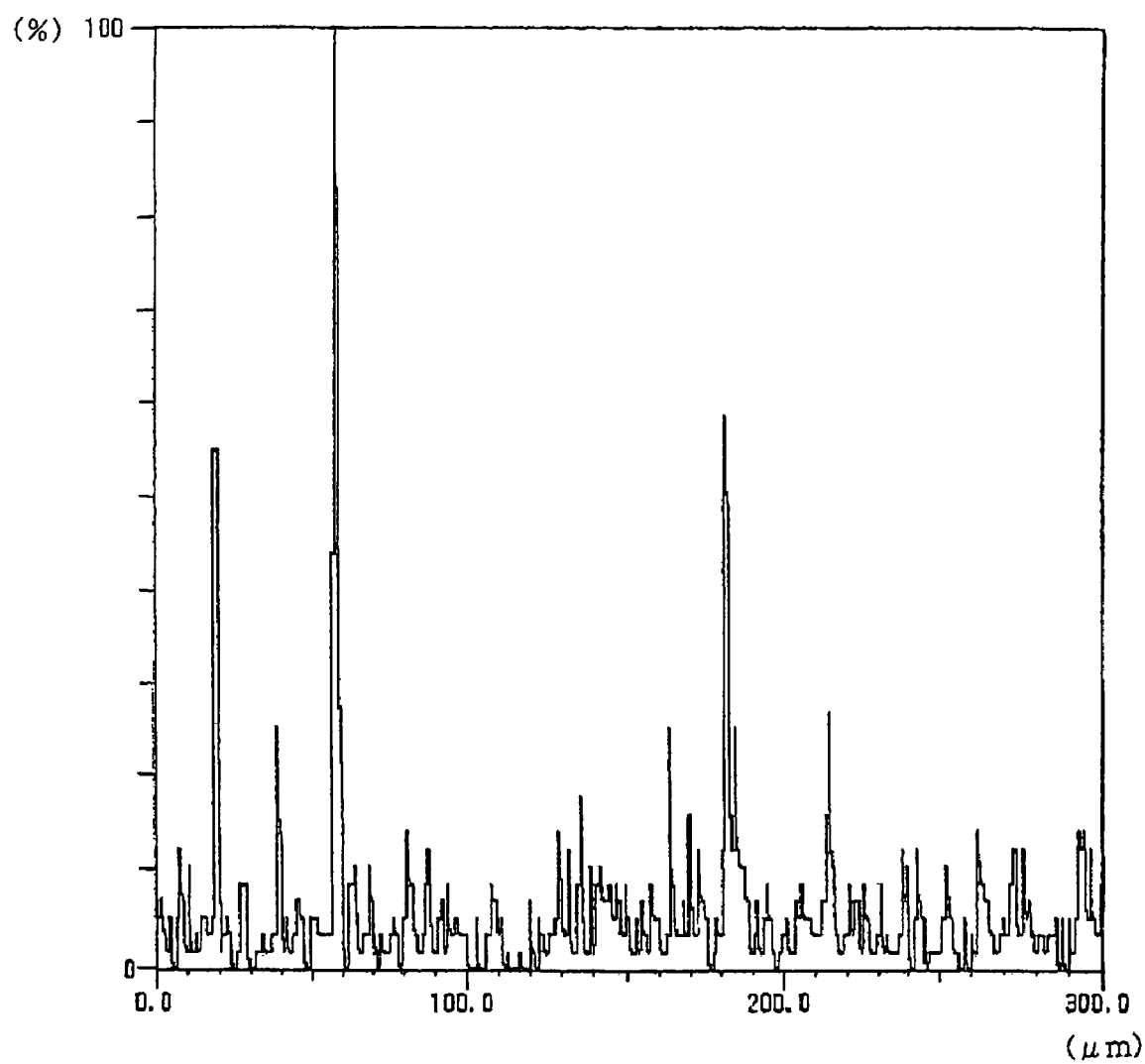
FIG. 3 is a diagram showing a result of line analysis on a lithium-transition metal composite oxide in Example 2-1 for 2 points within a distance of 300 μm using EPMA.

FIG. 3 shows a chart illustrating an existence state of magnesium, obtained through line analysis of the positive electrode active material in Example 2-1 using EPMA. FIG. 3 shows that magnesium was uniformly dispersed on the particle surface of the lithium-transition metal composite oxide of the positive electrode active material in Example 2-1 with little segregation.

Figure 4:
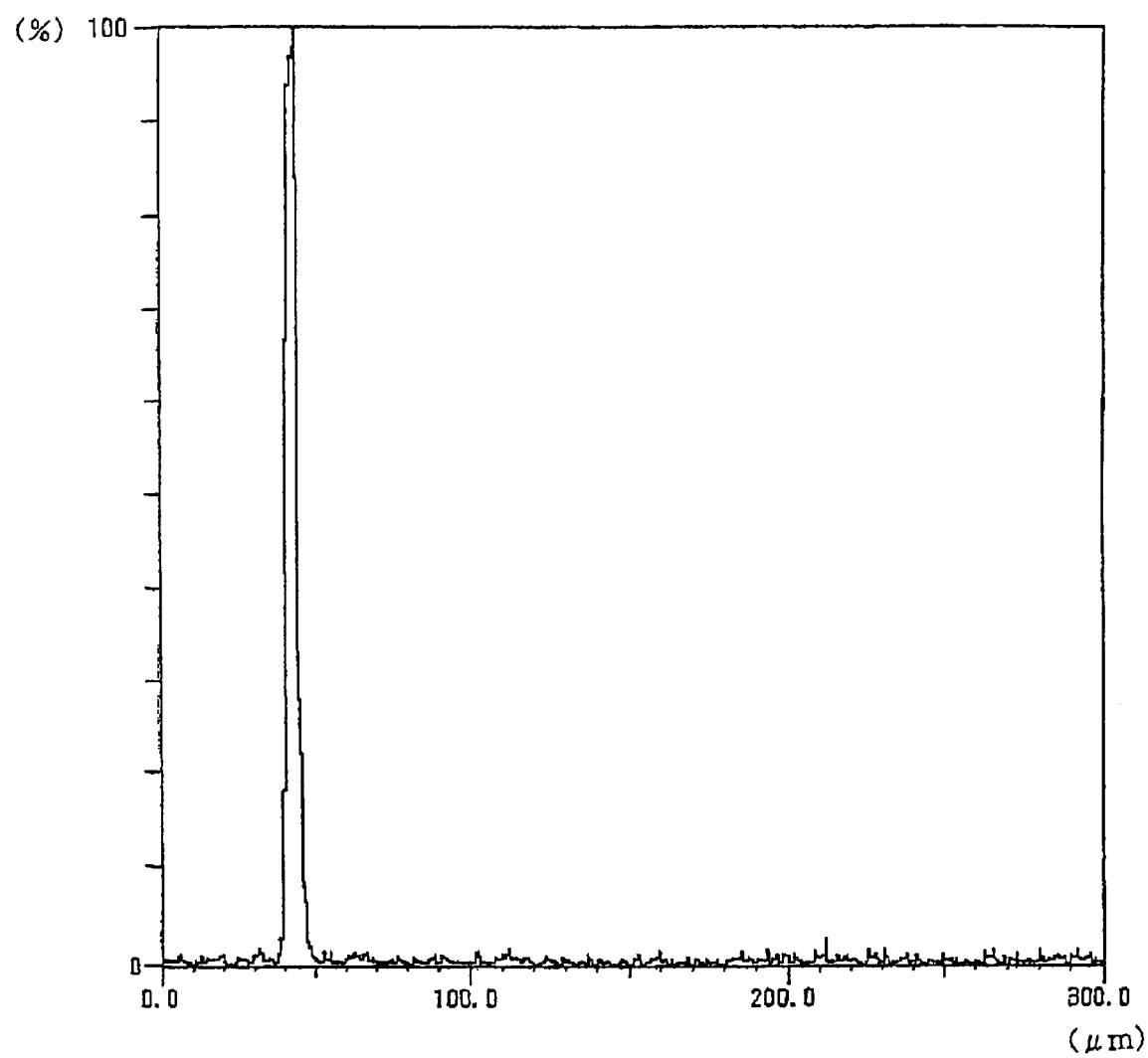
FIG. 4 is a diagram showing a result of line analysis on a lithium-transition metal composite oxide in Comparative Example 2-1 for 2 points within a distance of 300 μm using EPMA.

FIG. 4 shows a chart illustrating the existence state of magnesium, obtained through line analysis of the positive electrode active material obtained in Comparative Example 2-1 using EPMA. FIG. 4 shows that magnesium hardly existed or was segregated even if present on the particle surface of the lithium-transition metal composite oxide of the positive electrode active material in Comparative Example 2-1.

The positive electrode active material obtained in Example 3-1 was lithium cobaltate containing 0.2 mol % titanium. The EPMA results indicated that titanium existed uniformly on the surface of the positive electrode active material obtained in Example 3-1. The existence ratio of titanium on the particle surface was 100%.

The positive electrode active material obtained in Comparative Example 3-1 was lithium cobaltate containing 0.1 mol % titanium. The EPMA results indicated that titanium was greatly segregated on the surface of the positive electrode active material obtained in Comparative Example 3-1. The existence ratio of titanium on the particle surface was 7.1%.

Figure 5:
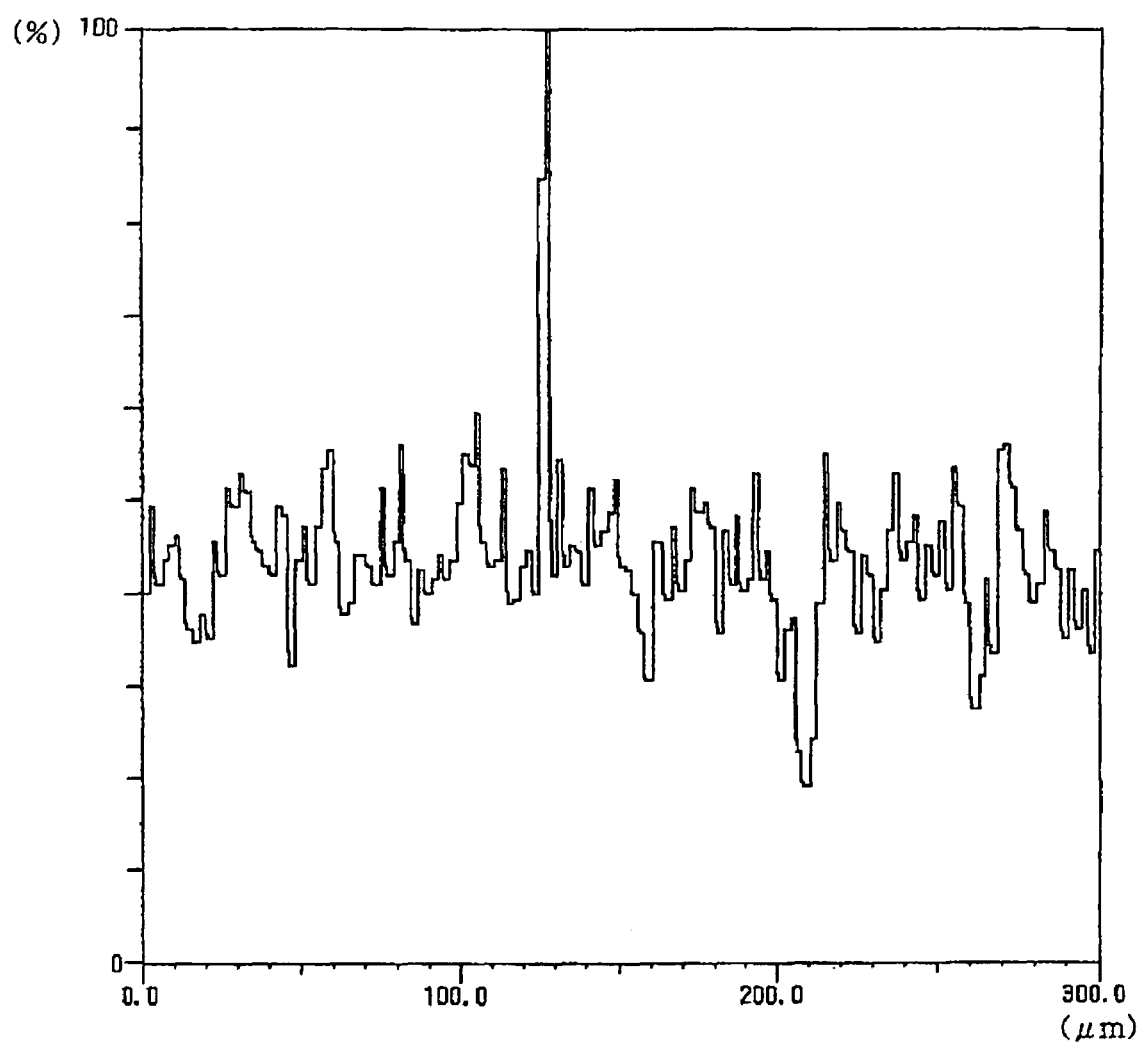
FIG. 5 is a diagram showing a result of line analysis on a lithium-transition metal composite oxide in Example 3-1 for 2 points within a distance of 300 μm using EPMA.

FIG. 5 shows a chart illustrating the existence state of titanium, obtained through line analysis of the positive electrode active material in Example 3-1 using EPMA. FIG. 5 shows that titanium was uniformly dispersed on the particle surface of the lithium-transition metal composite oxide of the positive electrode active material in Example 3-1 with little segregation.

Figure 6:
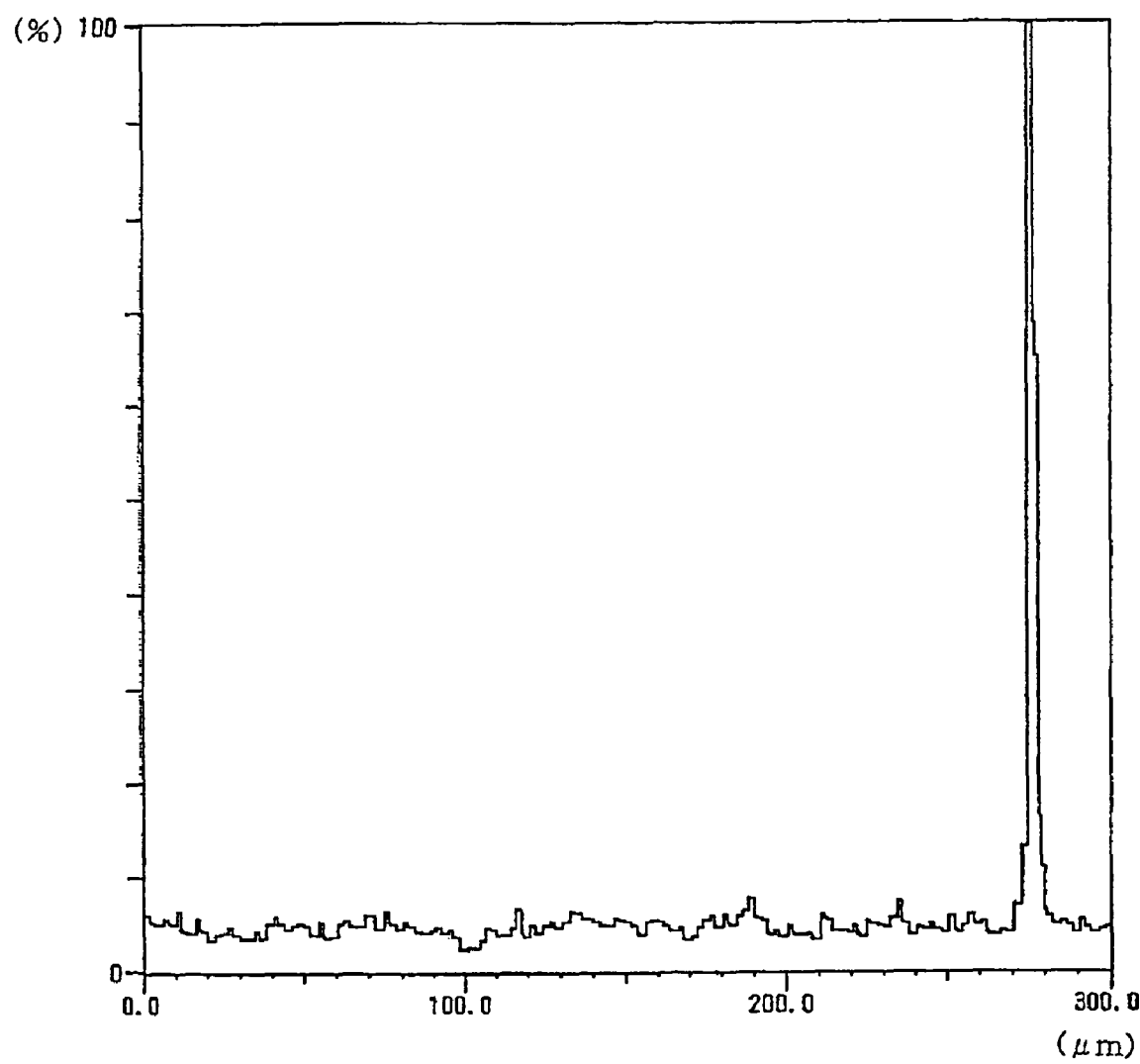
FIG. 6 is a diagram showing a result of line analysis on a lithium-transition metal composite oxide in Comparative Example 3-1 for 2 points within a distance of 300 μm using EPMA.

FIG. 6 shows a chart illustrating the existence state of titanium, obtained through line analysis of the positive electrode active material obtained in Comparative Example 3-1 using EPMA. FIG. 6 shows that titanium hardly existed, or was segregated even if present on the particle surface of the lithium-transition metal composite oxide of the positive electrode active material in Comparative Example 3-1.

The positive electrode active material obtained in Example 4-1 was lithium cobaltate containing 0.5 mol % zirconium and 0.5 mol % magnesium. The EPMA results indicated that zirconium and magnesium existed uniformly on the surface of the positive electrode active material obtained in Example 4-1. The existence ratios of zirconium and magnesium on the particle surface were respectively 32% and 73%.

The positive electrode active material obtained in Example 4-2 was lithium cobaltate containing 0.04 mol % zirconium, 1.0 mol % magnesium, and 1.0 mol % aluminum. The EPMA results indicated that zirconium, magnesium, and aluminum existed uniformly on the surface of the positive electrode active material obtained in Example 4-2. The existence ratios of zirconium, magnesium, and aluminum on the particle surface were respectively 45%, 100%, and 97%.

The positive electrode active material obtained in Example 1-4 was lithium cobaltate containing 0.5 mol % zirconium and 0.5 mol % magnesium. The EPMA results indicated that zirconium existed uniformly but magnesium was greatly segregated on the surface of the positive electrode active material obtained in Example 1-4. The existence ratios of zirconium and magnesium on the particle surface were respectively 51% and 6%.

The positive electrode active material obtained in Example 1-5 was lithium cobaltate containing 0.5 mol % zirconium and 1.0 mol % magnesium. The EPMA results indicated that zirconium existed uniformly but magnesium was greatly segregated on the surface of the positive electrode active material obtained in Example 1-5. The existence ratios of zirconium and magnesium on the particle surface were respectively 55% and 4%.

Figure 7:
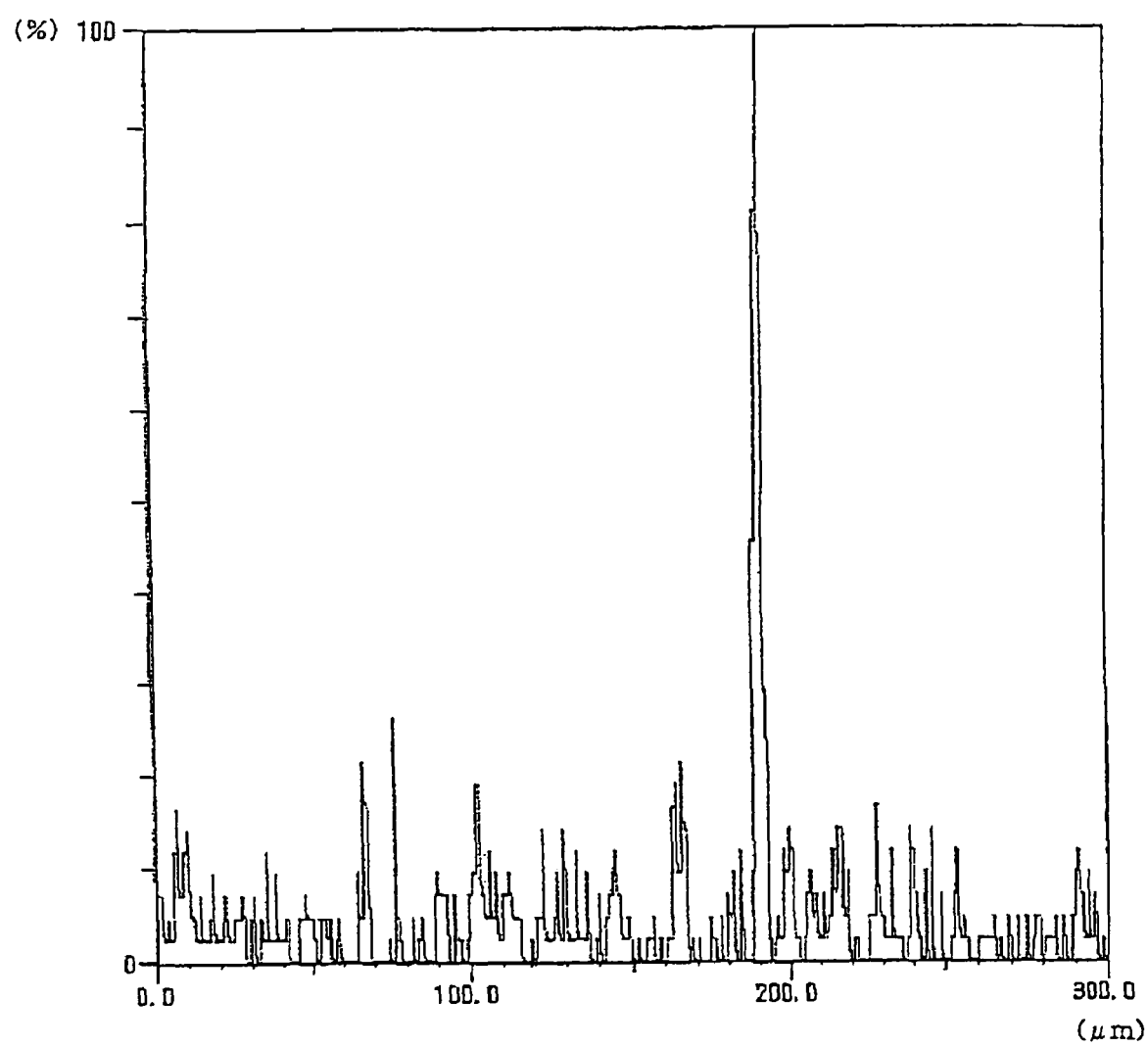
FIG. 7 is a diagram showing a result of line analysis on Zr of a positive electrode active material in Example 4-1 for 2 points within a distance of 300 μm using EPMA.
Figure 8:
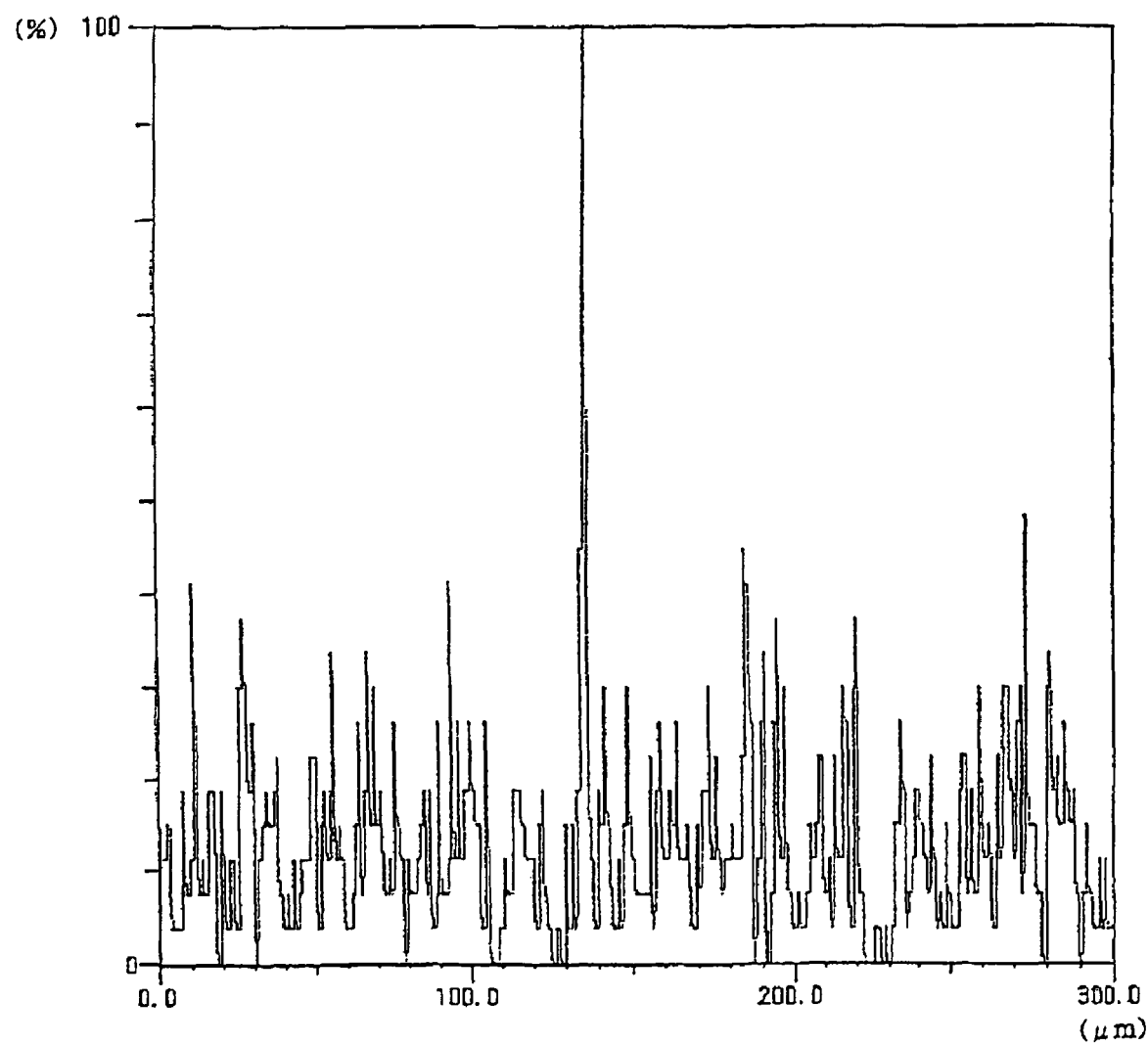
FIG. 8 is a diagram showing a result of line analysis on Mg of a positive electrode active material in Example 4-1 for 2 points within a distance of 300 μm using EPMA.

FIGS. 7 and 8 show charts illustrating the existence states of zirconium and magnesium, obtained through line analysis of the positive electrode active material in Example 4-1 using EPMA. FIGS. 7 and 8 show that zirconium and magnesium were uniformly dispersed on the particle surface of the lithium-transition metal composite oxide of the positive electrode active material in Example 4-1 with little segregation.

Figure 9:
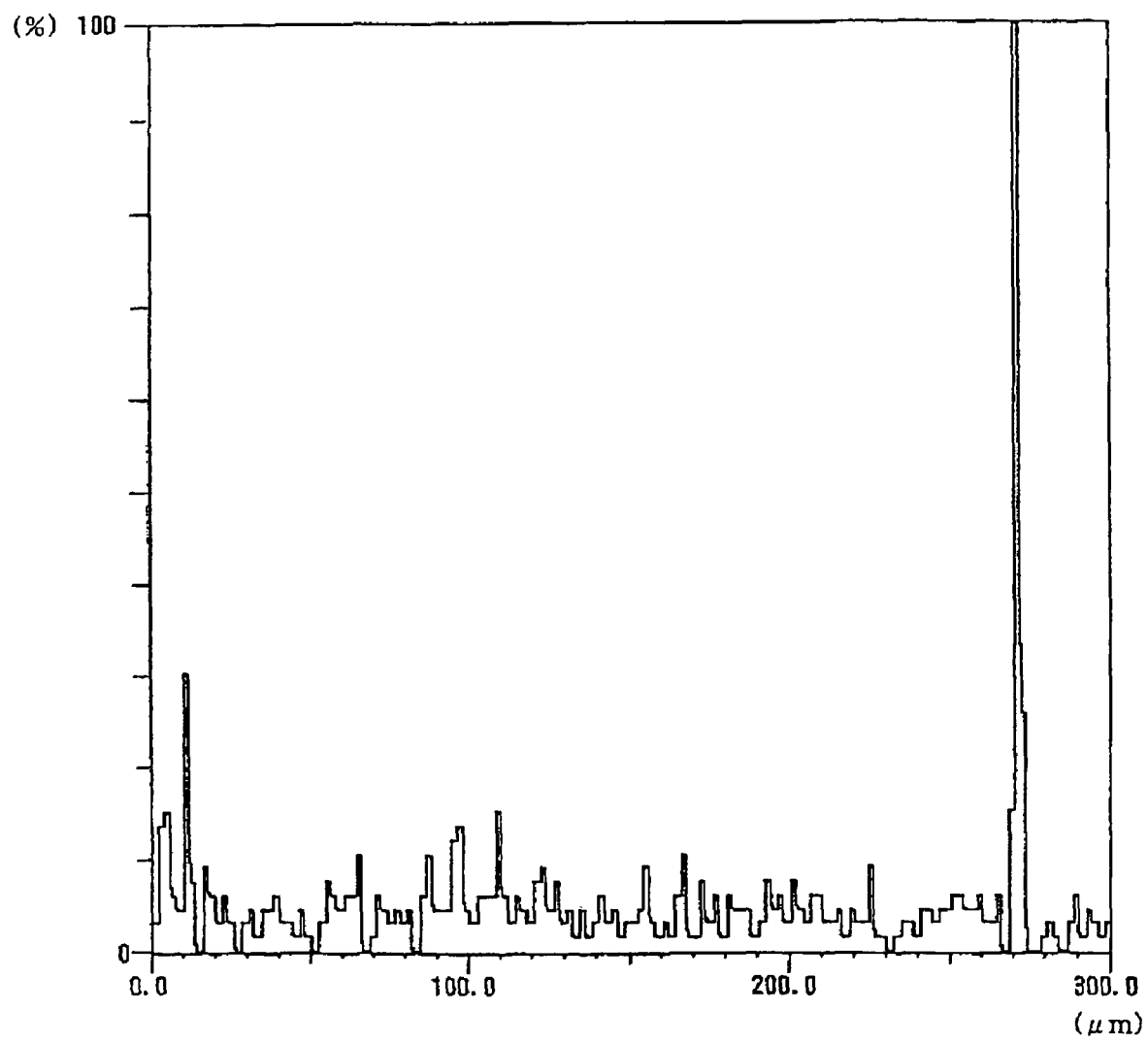
FIG. 9 is a diagram showing a result of line analysis on Zr of a positive electrode active material in Example 4-2 for 2 points within a distance of 300 μm using EPMA.
Figure 10:
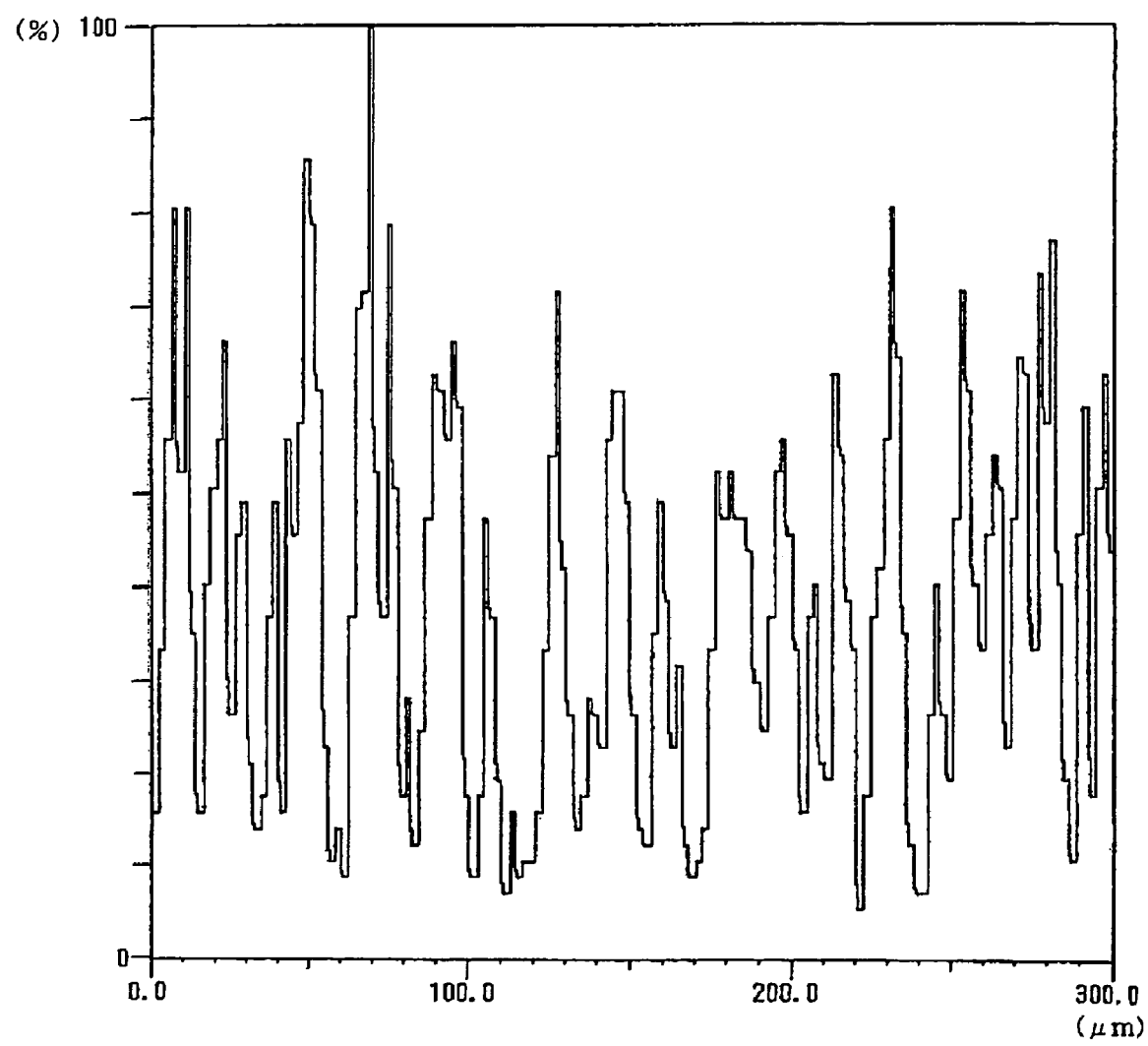
FIG. 10 is a diagram showing a result of line analysis on Mg of a positive electrode active material in Example 4-2 for 2 points within a distance of 300 μm using EPMA.
Figure 11:
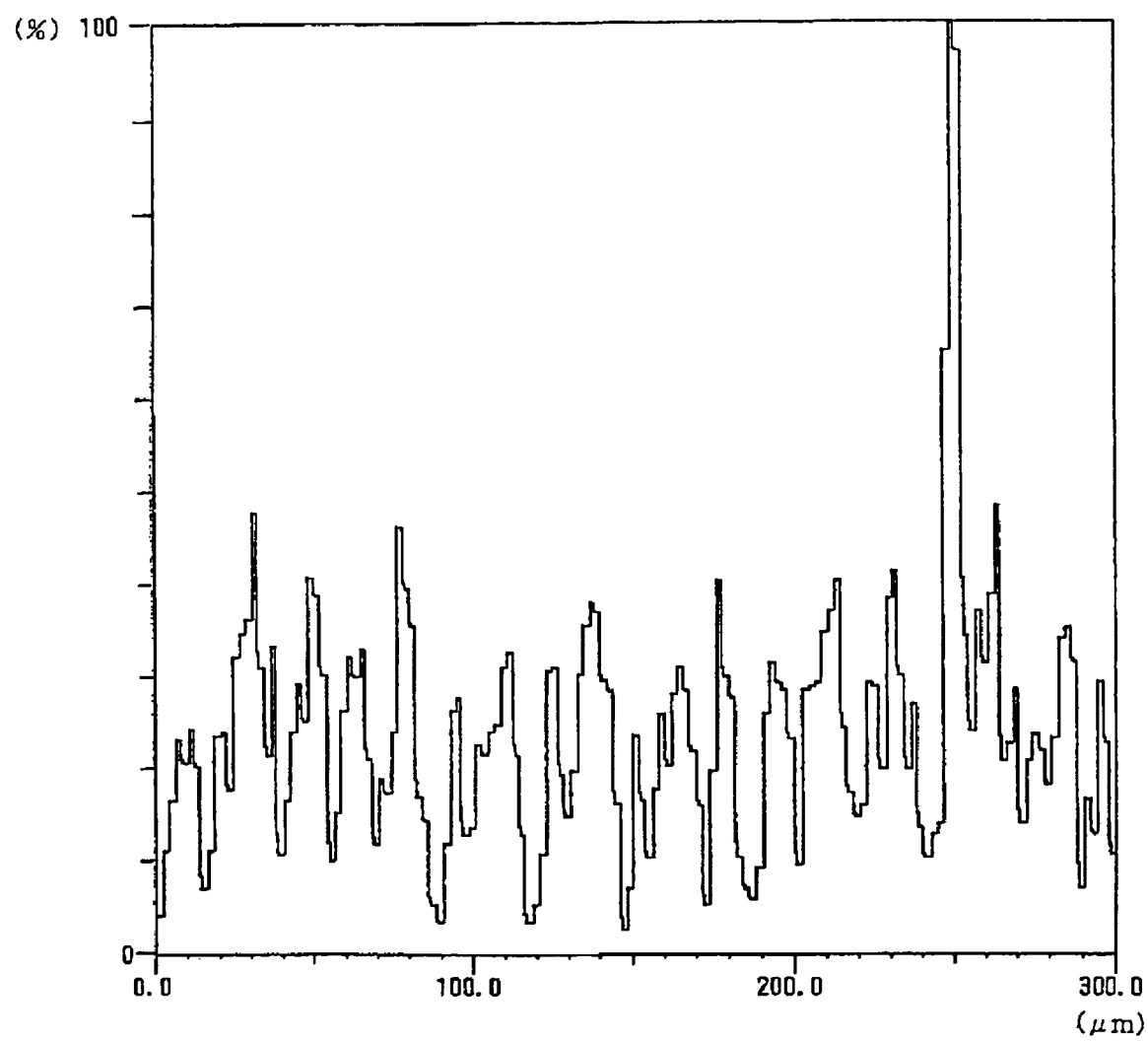
FIG. 11 is a diagram showing a result of line analysis on Al of a positive electrode active material in Example 4-2 for 2 points within a distance of 300 μm using EPMA.

FIGS. 9, 10, and 11 show charts illustrating the existence states of zirconium, magnesium, and aluminum, obtained through line analysis of the positive electrode active material in Example 4-2 using EPMA. FIGS. 9, 10, and 11 show that zirconium, magnesium, and aluminum were uniformly dispersed on the particle surface of the lithium-transition metal composite oxide of the positive electrode active material in Example 4-2 with little segregation.

Figure 12:
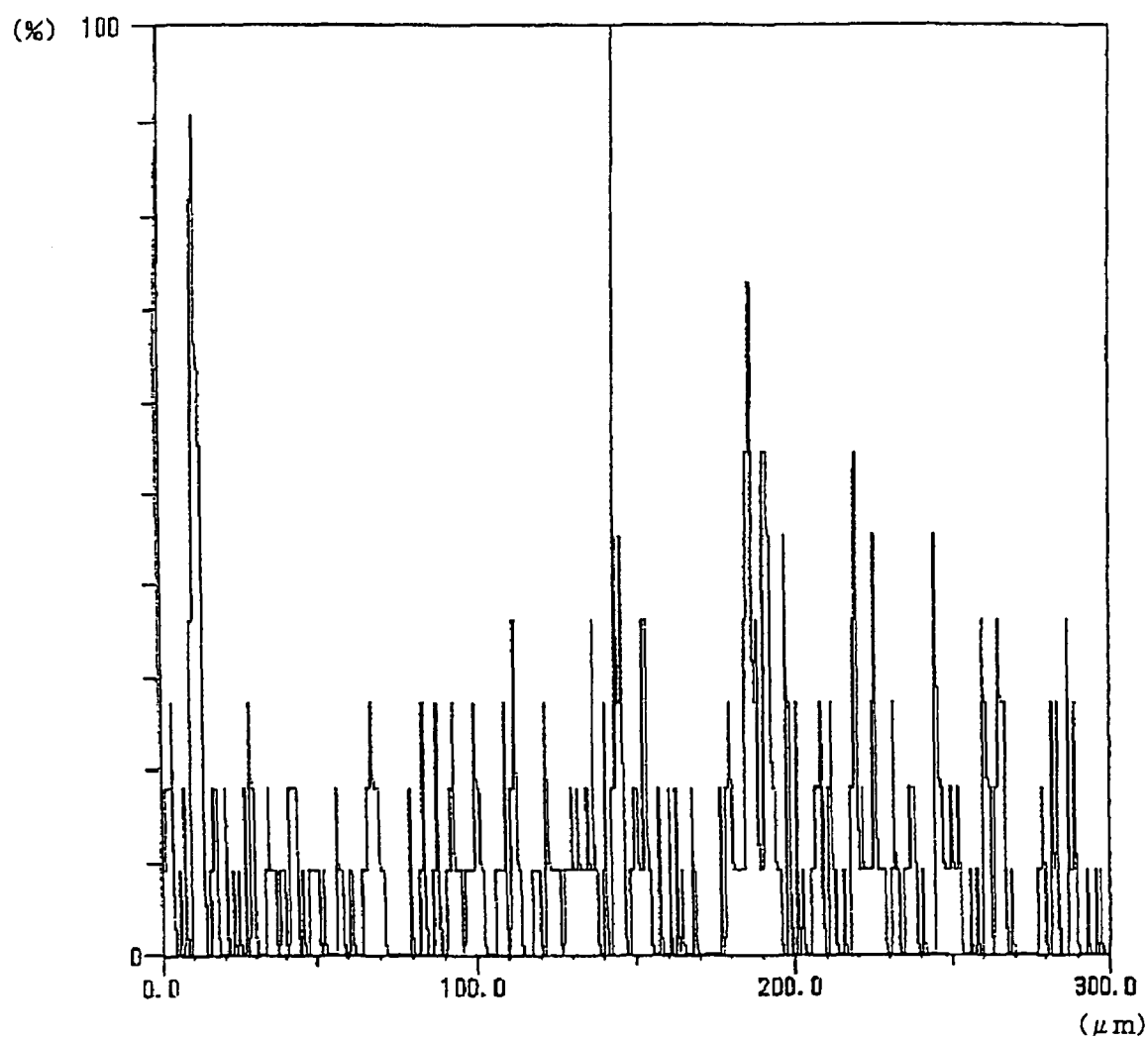
FIG. 12 is a diagram showing a result of line analysis on Zr of a positive electrode active material in Example 1-4 for 2 points within a distance of 300 μm using EPMA.
Figure 13:
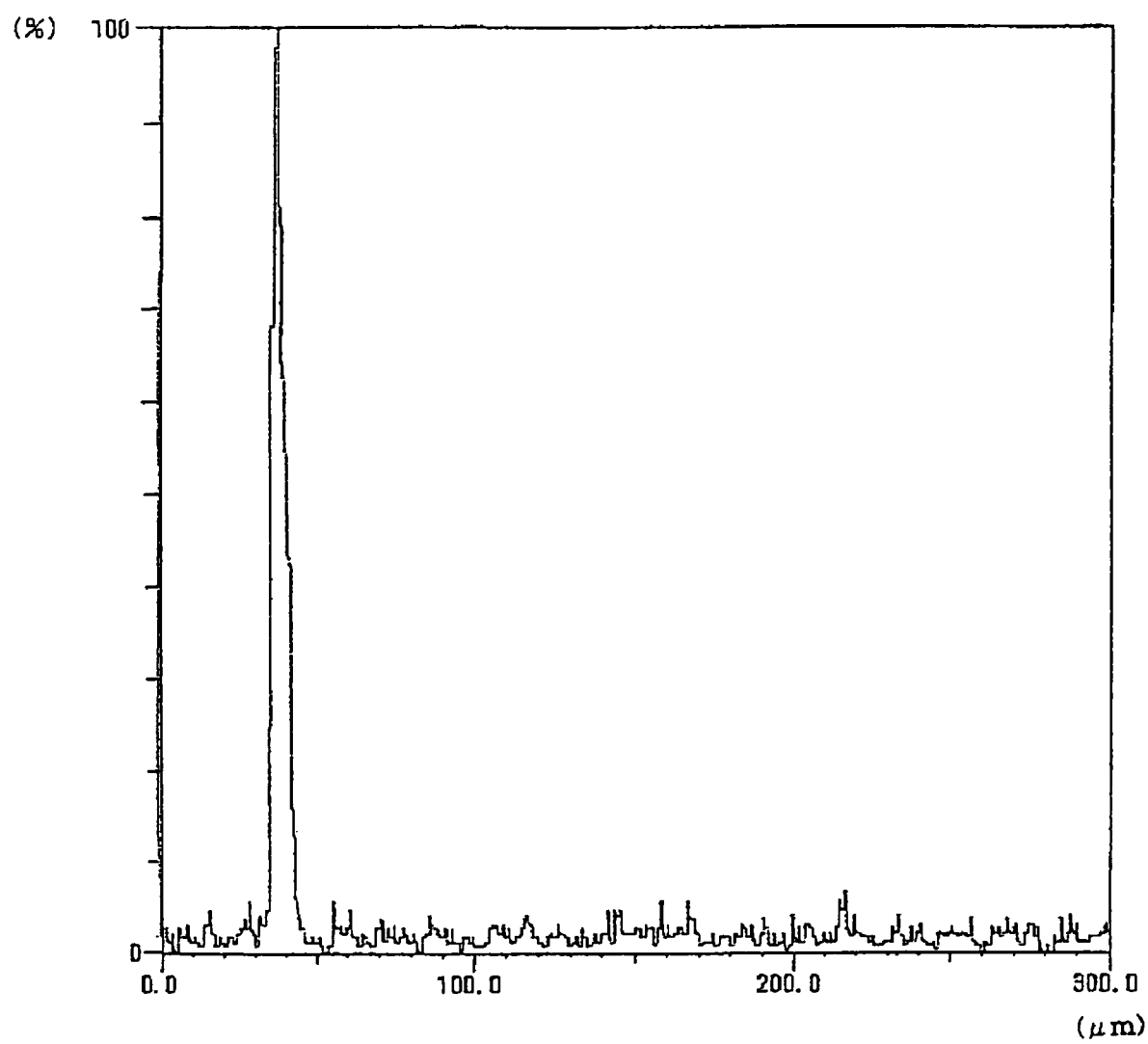
FIG. 13 is a diagram showing a result of line analysis on Mg of a positive electrode active material in Example 1-4 for 2 points within a distance of 300 μm using EPMA.

FIGS. 12 and 13 show charts illustrating the existence states of zirconium and magnesium, obtained through line analysis of the positive electrode active material in Example 1-4 using EPMA. FIGS. 12 and 13 show that zirconium was uniformly dispersed but magnesium was segregated on the particle surface of the lithium-transition metal composite oxide of the positive electrode active material in Example 1-4.

Figure 14:
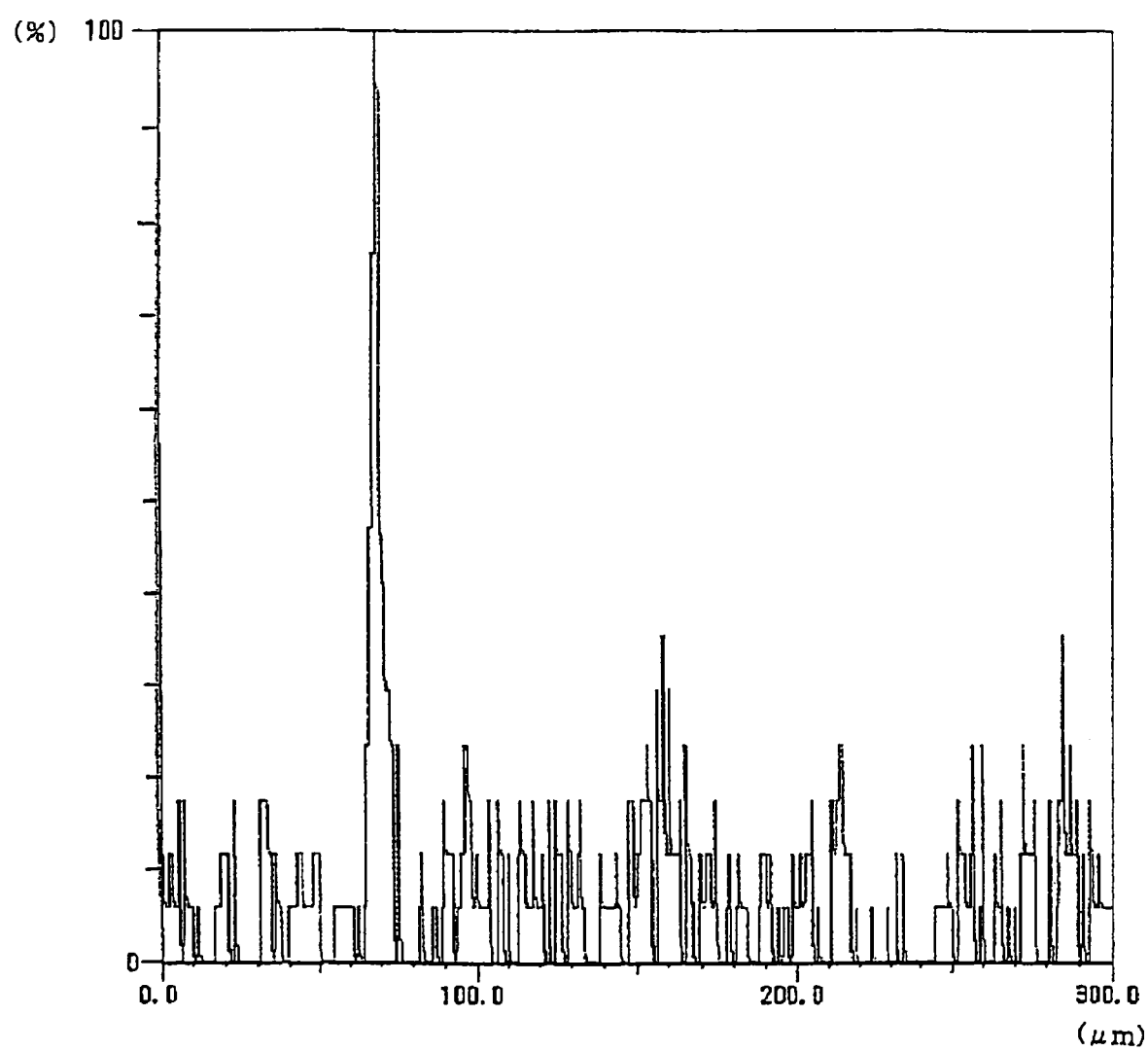
FIG. 14 is a diagram showing a result of line analysis on Zr of a positive electrode active material in Example 1-5 for 2 points within a distance of 300 μm using EPMA.
Figure 15:
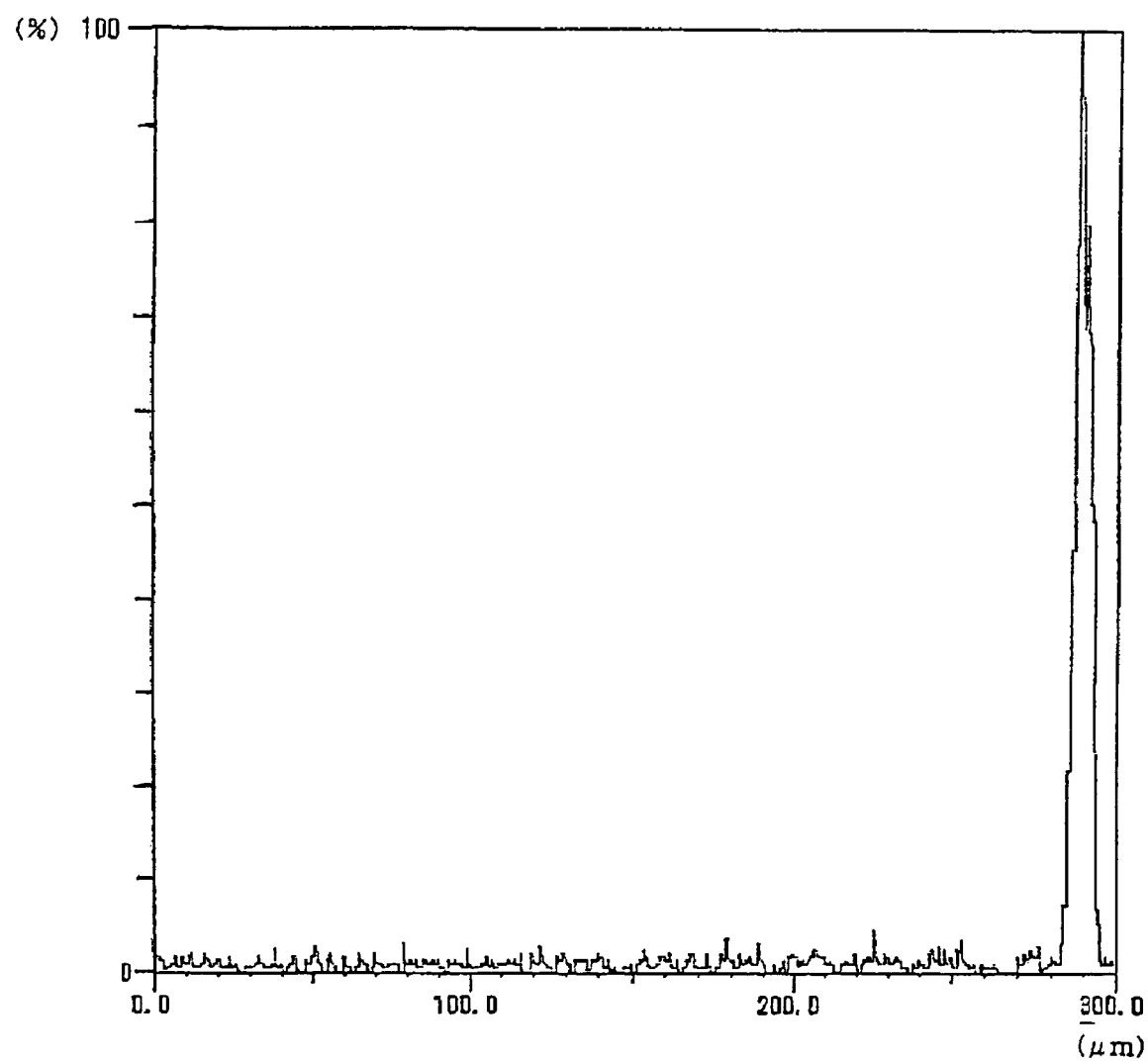
FIG. 15 is a diagram showing a result of line analysis on Mg of a positive electrode active material in Example 1-5 for 2 points within a distance of 300 μm using EPMA.

FIGS. 14 and 15 show charts illustrating the existence states of zirconium and magnesium, obtained through line analysis of the positive electrode active material in Example 1-5 using EPMA. FIGS. 14 and 15 show that zirconium was uniformly dispersed but magnesium was segregated on the particle surface of the lithium-transition metal composite oxide of the positive electrode active material in Example 1-5.

(2) Specific Surface Area of Positive Electrode Active Material

The specific surface area of the obtained positive electrode active materials was measured by a constant-pressure BET adsorption method using nitrogen gas.

The specific surface area of the positive electrode active material obtained in Example 1-1 was 0.55 m$^2$/g, and the specific surface area of the positive electrode active material obtained in Comparative Example 1-1 was 0.47 m$^2$/g.

(3) Crystallinity of Positive Electrode Active Material

The obtained positive electrode active materials were subjected to an X-ray diffraction analysis.

The X-ray diffraction analysis can be performed under the conditions of, for example, a tube current of 100 mA and a tube voltage of 40 kV. The crystallinity can be calculated from diffraction peaks ascribable to a (104) plane or a (110) plane obtained by the X-ray diffraction analysis using the Scherrer equation represented by the following equation (1).

$$D = K\lambda/(\beta \cos\theta) \tag{1}$$

In the equation, D represents a (104) crystallinity (Å) or a (110) crystallinity (Å), K represents the Scherrer constant (a value providing a diffraction peak of 1,000 Å ascribable to the (104) plane or the (110) plane obtained using sintered Si for optical system alignment (available from Rigaku Corporation)), and λ represents a wavelength of an X-ray source (1.540562 Å for CuKα1). β is calculated by β=By (B represents a width of an observation profile; and y is calculated by y=0.9991−0.019505b−2.8205b$^2$+2.878b$^3$−1.0366b$^4$; here, b represents a width of a device constant profile), and θ represents a diffraction angle (degree).

The X-ray diffraction was performed on an X-ray diffraction device using CuKα1 as an X-ray source under the conditions of a tube current of 100 mA and a tube voltage of 40 kV.

The (110) crystallinity of the positive electrode active material obtained in Example 1-1 was 924 Å, and the (110) crystallinity of the positive electrode active material obtained in Comparative Example 1-1 was 989 Å.

3. Evaluation of Positive Electrode Active Material (1)

(1) Preparation of Lithium Ion Secondary Battery

Test secondary batteries were fabricated using the positive electrode active materials respectively obtained in Examples 1-1 and 1-2 as well as Comparative Example 1-1 and were evaluated as described below.

90 parts by weight of positive electrode active material powder, 5 parts by weight of carbon powder serving as a conductive agent, and a solution of polyvinylidene fluoride in n-methylpyrrolidone (5 parts by weight as polyvinylidene fluoride) were kneaded to prepare a paste. The paste was coated on a positive electrode current collector to obtain a test secondary battery with lithium metal as the negative electrode.

(2) High Rate Characteristics

Initial discharge capacity was measured under the conditions of a discharging load of 0.2 C (note that 1 C represents a current load at which discharge completes in 1 hour), a charging potential of 4.3 V, and a discharging potential of 2.75 V. Then, load discharge capacity was measured under the conditions of a discharging load of 1 C, a charging potential of 4.3 V, and a discharging potential of 2.75 V. A load capacity maintenance ratio (%) at a discharging load of 1 C was determined following an equation represented below.

Load capacity maintenance ratio (%)=(discharging capacity at 1 C)/(discharging capacity at 0.2 C)×100

Next, high-load discharge capacity was measured under the conditions of a discharging load of 2 C, a charging potential of 4.3 V, and a discharging potential of 2.75 V. The load capacity maintenance ratio (%) at a discharging load of 2 C was determined following an equation represented below.

Load capacity maintenance ratio (%)=(discharging capacity at 2 C)/(discharging capacity at 0.2 C)×100

(3) Average Potential

The initial discharge capacity and an electric energy were measured under the conditions of a discharging load of 0.2 C, a charging potential of 4.3 V, and a discharging potential of 2.75 V. An average potential was determined following an equation represented below.

Average potential (V)=electric energy (mWh/g)/Capacity (mAh/g)

Figure 16:
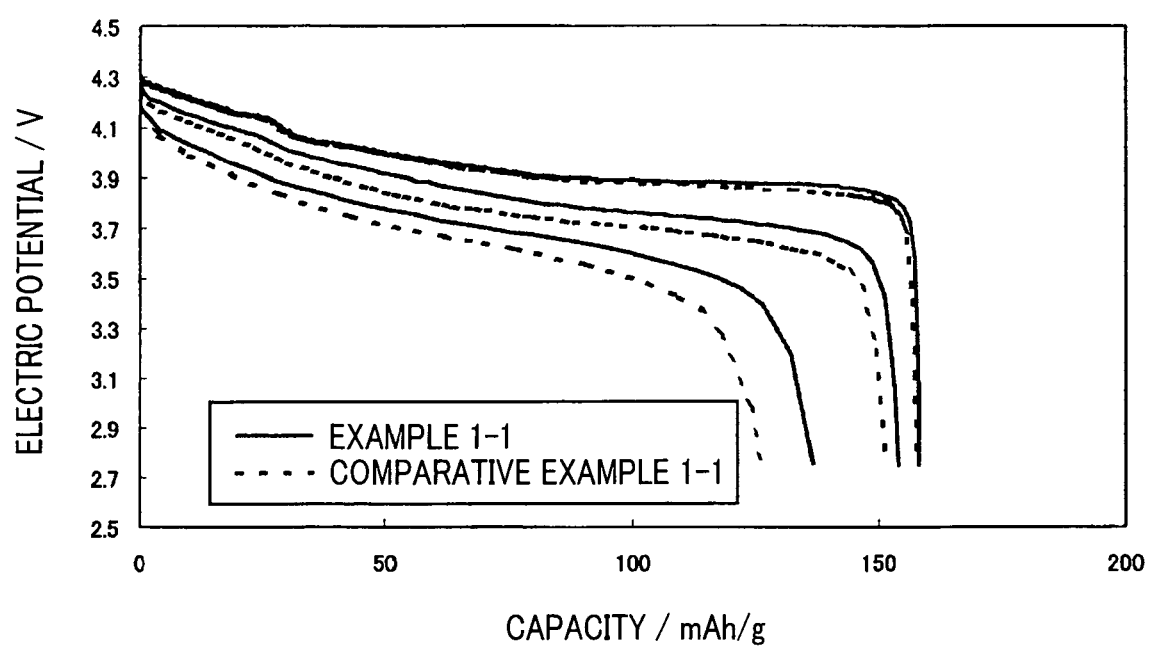
FIG. 16 is a diagram showing a relationship between discharge capacity and potential of a lithium-transition metal composite oxide in Example 1-1 and a lithium-transition metal composite oxide in Comparative Example 1-1.
Figure 17:
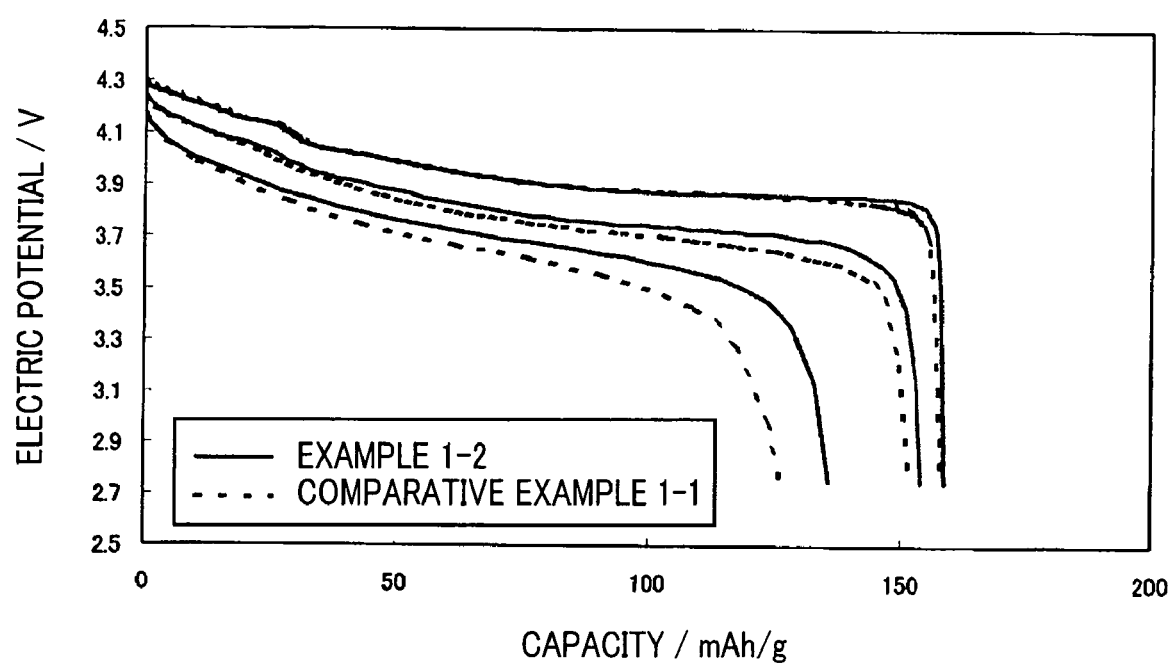
FIG. 17 is a diagram showing a relationship between discharge capacity and potential of a lithium-transition metal composite oxide in Example 1-2 and a lithium-transition metal composite oxide in Comparative Example 1-1.

Table 1 shows the results. Further, FIG. 16 shows a relationship between the discharge capacity and the potential measured when determining the average potential of the test secondary batteries employing the positive electrode active materials of Example 1-1 and Comparative Example 1-1. FIG. 17 shows the relationship between the discharge capacity and the potential measured when determining the average potential of the test secondary batteries employing the positive electrode active materials of Example 1-2 and Comparative Example 1-1.

TABLE 1

|  | Load capacity maintenance ratio (%) | | Average potential (V) |
|---|---|---|---|
|  | 2 C/0.2 C | 1 C/0.2 C |  |
| Example 1-1 | 86.8 | 97.6 | 3.703 |
| Example 1-2 | 85.8 | 97.1 | 3.703 |
| Comparative Example 1-1 | 80.1 | 95.8 | 3.655 |

Table 1 shows that the positive electrode active materials of the present invention (Examples 1-1 and 1-2) have excellent high rate characteristics and high-high rate characteristics at high potentials.

Further, the positive electrode active materials of the present invention exhibit excellent power characteristics and low-temperature power characteristics because impedance and low-temperature impedance are small. Further, positive electrode active materials of the present invention exhibit excellent low-temperature high rate characteristics and thermal stability.

On the other hand, the positive electrode active material with a small existence ratio of Zr on the surface of the lithium-transition metal composite oxide obtained using starting material mixture powder prepared by mixing through a dry method (Comparative Example 1-1) had poor potential, high rate characteristics, high-high rate characteristics, low-temperature high rate characteristics, power characteristics, low-temperature power characteristics, and thermal stability.

4. Evaluation of Positive Electrode Active Material (2)

Laminate batteries were fabricated using the positive electrode active materials respectively obtained in Examples 1-1 and Comparative Example 1-2 and were evaluated as described below.

A positive electrode plate was obtained in the same manner as for the test secondary batteries. A carbon material was used as a negative electrode active material, which was coated on a negative electrode current collector and dried in the same manner as for the positive electrode plate to obtain a negative electrode plate. A porous polypropylene film was used as a separator. A 1 mol/L solution prepared by dissolving $LiPF_6$ to a mixed solvent of ethylene carbonate/methyl ethyl carbonate=3/7 (volume ratio) was used as an electrolytic solution. The positive electrode plate, the negative electrode plate, and the separator were formed into thin sheets, which were laminated and accommodated into a laminate film battery case. The electrolytic solution was injected into the battery case, to thereby obtain a laminate battery.

(1) Impedance

The impedance was measured using impedance measuring devices (SI1287 and SI1260, both manufactured by Solartron Analytical).

An inner impedance of the laminate battery was measured at 0.1 Hz by attaching a clip of measuring device to lead wires provided on the positive and negative electrodes of the laminate battery by an alternating impedance method under the conditions of SOC 60% and 0° C. Apparently, the smaller the impedance is, the better the power characteristics is.

(2) Thermal Stability

The laminate battery was charged and discharged at a constants current for conformability. Thereafter, the laminate battery was charged under the conditions of CC-CV charge, a terminal voltage of 4.2 V, a terminal charge current of 0.02 mA, and 0.2 C rate. After completion of the charge, the positive electrode was removed from the laminate battery, washed with a solution of one of the components in the electrolytic solution used for the laminate battery, and dried, to scrape off the positive electrode active material from the positive electrode. Ethylene carbonate used for the electrolytic solution and the positive electrode active material scraped off from the positive electrode were put in an aluminum cell in a weight ratio of 0.40:1.00, and differential scanning calories were measured at a rate of temperature increase of 5.0° C./min.

Differential scanning calorimetry (DSC) is a method performed while changing the temperature of a material and a reference material following a program. The DSC measures a difference between energy inputs to the material and the reference material as a function of temperature. The differential scanning calories did not change as the temperature increased in low temperatures, but the differential scanning calories increased greatly at a certain temperature or above. The temperature at this time was defined as a heating starting temperature. Apparently, the higher the heating starting temperature is, the better the thermal stability is.

Table 2 shows the results.

TABLE 2

|  | Impedance (Ω) | Heating starting temperature (° C.) |
|---|---|---|
| Example 1-1 | 4.3 | 181.7 |
| Comparative Example 1-2 | 10 | 163.9 |

Table 2 shows that the positive electrode active material of the present invention (Example 1-1) has the reduced impedance and excellent power characteristics as well as excellent thermal stability.

5. Evaluation of Positive Electrode Active Material (3)

The test secondary batteries with lithium metal as the negative electrode were fabricated in the same manner as described above using the positive electrode active materials respectively obtained in Example 1-3 and Comparative Example 1-3, and the high rate characteristics thereof were evaluated in the same manner as described above.

Further, the test secondary batteries with carbon as a negative electrode were fabricated in the same manner as described above using the positive electrode active materials respectively obtained in Example 1-3 and Comparative Example 1-3 except that the negative electrode was carbon, and the impedances thereof were measured in the same manner as described above. An impedance reduction rate was determined by dividing a difference between an impedance value obtained in Comparative Example 1-3 and an impedance value obtained in Example 1-3 by the impedance value obtained in Comparative Example 1-3. Apparently, the larger the impedance reduction rate is, the better the power characteristics is.

Table 3 shows the results.

TABLE 3

|  | Load capacity maintenance ratio (%) | | Impedance reduction rate (%) |
|---|---|---|---|
|  | 2 C/0.2 C | 1 C/0.2 C |  |
| Example 1-3 | 74.9 | 88.9 | 25.3 |
| Comparative Example 1-3 | 71.5 | 88.3 | 0 |

Table 3 shows that the positive electrode active material of the present invention (Example 1-3) has excellent high rate characteristics and power characteristics.

6. Evaluation of Positive Electrode Active Material (4)

The test secondary batteries were fabricated in the same manner as described above using the positive electrode active materials respectively obtained in Example 2-1 as well as Comparative Examples 2-1 and 2-2 to evaluate the cycle characteristics, the low-temperature characteristics, and the thermal stability.

The results indicated that the positive electrode active material of the present invention (Example 2-1) had excellent cycle characteristics, low-temperature characteristics, and thermal stability.

7. Evaluation of Positive Electrode Active Material (5)

The test secondary batteries were fabricated in the same manner as described above using the positive electrode active materials respectively obtained in Example 3-1 as well as Comparative Examples 3-1 and 3-2 and were evaluated as follows.

(1) Initial Discharge Capacity at 0.2 C and Initial Discharge Capacity at 2.0 C

The initial discharge capacity at 0.2 C was measured under the conditions of a charging potential of 4.3 V, a discharging potential of 2.85 V, and a discharging load of 0.2 C.

Further, the initial discharge capacity at 2.0 C was measured under the conditions of a charging potential of 4.3 V, a discharging potential of 2.85 V, and a discharging load of 2.0 C.

(2) Load Capacity Maintenance Ratio

The initial discharge capacity was measured under the conditions of a charging potential of 4.3 V, a discharging potential of 2.70 V, and a discharging load of 0.2 C. Then, the load discharge capacity was measured under the conditions of a charging potential of 4.3 V, a discharging potential of 2.70 V, and a discharging load of 2.0 C. The load capacity maintenance ratio was determined by dividing the value of the obtained load discharge capacity by the value of the initial discharge capacity, to thereby evaluate the high rate characteristics.

(3) Electric Power

The discharge capacity and the average potential were measured at a discharging load of 0.2 C, and a product thereof was defined as electric power at 0.2 C.

The discharge capacity and the average potential were measured at a discharging load of 1.0 C, and a product thereof was defined as electric power at 1.0 C.

The discharge capacity and the average potential were measured at a discharging load of 2.0 C, and a product thereof was defined as electric power at 2.0 C.

(4) Thermal Stability

The thermal stability was evaluated in the same manner as in Evaluation of positive electrode active material (2) as described above except that the test secondary batteries were used instead of the laminate batteries, the terminal voltage during charge was 4.3 V, and the rate of temperature increase was 4.5° C./min for differential scanning calorimetry.

Table 4 shows the results. Note that "-" in the table means that the item concerned was not measured.

Table 4 shows that the positive electrode active material of the present invention (Example 3-1) had high discharge capacity, large electric power, excellent high rate characteristics, and excellent thermal stability.

TABLE 4

|  | Initial discharge capacity at 0.2 C (mAh/g) | Initial discharge capacity at 2.0 C (mAh/g) | Load capacity maintenance ratio (%) | Electric power at 0.2 C (Wh/kg) | Electric power at 1.0 C (Wh/kg) | Electric power at 2.0 C (Wh/kg) | Heating starting temperature (° C.) |
|---|---|---|---|---|---|---|---|
| Example 3-1 | 157.9 | 119.5 | 92.1 | 622 | 568 | 434 | 166.9 |
| Comparative Example 3-1 | 155.8 | 116.4 | 90.6 | 614 | 567 | 416 | 155.9 |
| Comparative Example 3-2 | 157.9 | 86.2 | 87.5 | 620 | 544 | 297 | — |

8. Evaluation of Positive Electrode Active Material (6)

The test secondary batteries were fabricated in the same manner as described above using the positive electrode active materials respectively obtained in Examples 4-1, 1-4, and 1-5 as well as Comparative Example 4-1 and were evaluated as follows.

(1) Initial Discharge Capacity at 0.2 C

The initial discharge capacity at 0.2 C was measured under the conditions of a charging potential of 4.5 V, a discharging potential of 2.85 V, and a discharging load of 0.2 C.

(2) Load Discharge Capacity

Charging and discharging of first cycle to third cycle were performed under the conditions of a charging potential of 4.5 V, a discharging potential of 2.85 V, and a discharging load of 0.2 C. Then, the charging and discharging of fourth cycle were performed under the conditions of a charging potential of 4.5 V, a discharging potential of 2.85 V, and a discharging load of 1.0 C. Thereafter, the discharge capacity of fifth cycle was measured under the conditions of a charging potential of 4.5 V, a discharging potential of 2.85 V, and a discharging load of 2.0 C.

(3) Discharge Capacity of Sixth Cycle

The charging and discharging of the first cycle to the third cycle were performed under the conditions of a charging potential of 4.5 V, a discharging potential of 2.85 V, and a discharging load of 0.2 C. Then, the charging and discharging of the fourth cycle were performed under the conditions of a charging potential of 4.5 V, a discharging potential of 2.85 V, and a discharging load of 1.0 C. The charging and discharging of fifth cycle were performed under the conditions of a charging potential of 4.5 V, a discharging potential of 2.85 V, and a discharging load of 2.0 C. Thereafter, the discharge capacity of sixth cycle was measured under the conditions of a charging potential of 4.5 V, a discharging potential of 2.85 V, and a discharging load of 0.2 C.

(4) Discharge Capacity Maintenance Ratio of Sixth Cycle

The discharge capacity maintenance ratio of the sixth cycle was determined by dividing the discharge capacity of the sixth cycle obtained as above by the initial discharge capacity of 0.2 C, to thereby evaluate the cycle characteristics.

(5) Thermal Stability

The thermal stability was evaluated in the same manner as in Evaluation of positive electrode active material (2) as described above except that the test secondary batteries were used instead of the laminate batteries, the terminal voltage during charge was 4.5 V, and the rate of temperature increase was 4.5° C./min for differential scanning calorimetry.

Table 5 shows the results.

Table 5 shows that the positive electrode active materials of the present invention (Examples 4-1, 1-4, and 1-5) had high initial discharge capacity, excellent high rate characteristics, and excellent cycle characteristics. Of those, the positive electrode active material of the present invention with an existence ratio of each of zirconium and magnesium of 20% or more on the surface of the lithium-transition metal composite oxide (Example 4-1) had even better thermal stability.

On the other hand, the positive electrode active material in Comparative Example 4-1 had poor high rate characteristics and cycle characteristics.

TABLE 5

|  | Initial discharge capacity (mAh/g) | Load discharge capacity (mAh/g) | Discharge capacity of sixth cycle (mAh/g) | Capacity maintenance ratio of sixth cycle (%) | Heating starting temperature (° C.) |
|---|---|---|---|---|---|
| Example 4-1 | 192.6 | 147.3 | 191.1 | 0.992 | 140.9 |
| Example 1-4 | 191.0 | 144.0 | 189.2 | 0.991 | 129.0 |
| Example 1-5 | 190.4 | 147.8 | 188.8 | 0.992 | 133.3 |
| Comparative Example 4-1 | 192.6 | 141.9 | 179.5 | 0.932 | 137.2 |

9. Evaluation of Positive Electrode Active Material (7)

The laminate batteries were fabricated in the same manner as described above using the positive electrode active materials respectively obtained in Example 4-2 and Comparative Example 4-1 and were evaluated as follows.

(1) Load Capacity Maintenance Ratio

The initial discharge capacity was measured under the conditions of a charging potential of 4.2 V, a discharging potential of 3.0 V, and a discharging load of 0.2 C. Then, the load discharge capacity was measured under the conditions of a charging potential of 4.2 V, a discharging potential of 3.0 V, and a discharging load of 3.0 C. The load capacity maintenance ratio was determined by dividing the obtained load discharge capacity by the initial discharge capacity, to thereby evaluate the high rate characteristics.

(2) Load Average Potential

The load discharge capacity and the electric energy were measured under the conditions of a charging potential of 4.2 V, a discharging potential of 3.0 V, and a discharging load of 3.0 C. The load average potential was determined by dividing the obtained electric energy by the load discharge capacity.

(3) Impedance

Impedance was measured in the same manner as in Evaluation of positive electrode active material (2) as described above.

(4) Thermal Stability

The thermal stability was measured in the same manner as in Evaluation of positive electrode active material (2) as described above.

(5) Discharge Capacity Maintenance Ratio

The discharge capacity was measured after 100 cycles of repeated charging and discharging under the conditions of a charging potential of 4.2 V, a discharging potential of 2.75 V, and a discharging load of 1 C. The discharge capacity maintenance ratio was determined by dividing the obtained discharge capacity after 100 cycles by the discharge capacity after 1 cycle, to thereby evaluate the cycle characteristics.

Table 6 shows the results.

Table 6 shows that the positive electrode active material of the present invention (Example 4-1) had the reduced impedance and excellent power characteristics. Further, the positive electrode active material of the present invention had high load average potential, excellent high rate characteristics, excellent thermal stability, and excellent cycle characteristics.

TABLE 6

|  | Load capacity maintenance ratio (%) | Load average potential (V) | Impedance (Ω) | Heating starting temperature (° C.) | Discharge capacity maintenance ratio (%) |
|---|---|---|---|---|---|
| Example 4-2 | 92.0 | 3.681 | 5.8 | 174.0 | 79.2 |
| Comparative Example 4-1 | 91.6 | 3.507 | 10.0 | 163.9 | 39.3 |

As described above, the positive electrode active material for a nonaqueous electrolyte secondary battery of the present invention is excellent in high rate characteristics, cycle characteristics, low-temperature characteristics, thermal stability and the like at high potentials. Therefore, the positive electrode active material for a nonaqueous electrolyte secondary battery of the present invention is suitably used for a lithium ion secondary battery and the like.

What is claimed is:

1. A positive electrode active material for a nonaqueous electrolyte secondary battery having at least a lithium-transition metal composite oxide of a layer structure,
wherein:
the lithium-transition metal composite oxide is a lithium cobaltate particle,
an existence ratio of zirconium and magnesium is respectively 20% or more, wherein the zirconium and magnesium are uniformly dispersed on a surface of the lithium cobaltate particle,
at least a part of the zirconium on said surface is present as lithium zirconate,
at least a part of the magnesium on said surface is present as magnesium oxide, and
the existence ratio is a quotient of a total length of all portions of a first line that exceeds 4% of peak value divided by a length of a second line passing through a point that has a highest concentration of zirconium or magnesium, respectively, that is assigned a peak value of 100%, wherein a concentration of zirconium or magnesium, respectively, per unit area is obtained from a line analysis of the surface of the lithium-transition metal composite oxide by using an electron probe microanalyzer.

2. A nonaqueous electrolyte secondary battery, comprising:
a strip positive electrode constituted by forming, on at least one side of a strip positive electrode current collector, a positive electrode active material layer employing the positive electrode active material for a nonaqueous electrolyte secondary battery according to claim 1;
a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating lithium ions; and
a strip separator;
in which:
the strip positive electrode and the strip negative electrode laminated with the strip separator between them are wound plural times to form a web of the strip positive electrode and the strip negative electrode with the strip separator intervening between them.

3. The positive electrode active material for a nonaqueous electrolyte secondary battery according to claim 1, wherein the positive electrode active material is prepared from a starting material mixture obtained by adding an aqueous solution containing cobalt ions, zirconium ions, and magnesium ions to an aqueous alkaline solution to precipitate.

4. A nonaqueous electrolyte secondary battery, comprising:
a strip positive electrode constituted by forming, on at least one side of a strip positive electrode current collector, a positive electrode active material layer employing the positive electrode active material for a nonaqueous electrolyte secondary battery according to claim 3;
a strip negative electrode constituted by forming, on at least one side of a strip negative electrode current collector, a negative electrode active material layer employing, as a negative electrode active material, a lithium metal, a lithium alloy, a carbon material capable of intercalating and deintercalating lithium ions or a compound capable of intercalating and deintercalating lithium ions; and
a strip separator;
in which:
the strip positive electrode and the strip negative electrode laminated with the strip separator between them are wound plural times to form a web of the strip positive electrode and the strip negative electrode with the strip separator intervening between them.

5. The positive electrode active material for a nonaqueous electrolyte secondary battery according to claim 1, wherein the surface of the lithium cobaltate particle further comprises aluminum at an existence ratio of 20% or more and at least a part of the aluminum on said surface is present as aluminum oxide.

6. The positive electrode active material for a nonaqueous electrolyte secondary battery according to claim 1, wherein the surface of the lithium cobaltate particle further comprises titanium at an existence ratio of 20% or more and at least a part of the titanium on said surface is present as lithium titanate.

7. The positive electrode active material for a nonaqueous electrolyte secondary battery according to claim 1, wherein the surface of the lithium cobaltate particle further comprises a sulfate group.

8. The positive electrode active material for a nonaqueous electrolyte secondary battery according to claim 1, wherein the existence ratio of zirconium is 40% or more.

9. The positive electrode active material for a nonaqueous electrolyte secondary battery according to claim 1, wherein the existence ratio of zirconium is 50% or more.

10. The positive electrode active material for a nonaqueous electrolyte secondary battery according to claim 1, wherein the existence ratio of zirconium is 60% or more.

11. The positive electrode active material for a nonaqueous electrolyte secondary battery according to claim 1, wherein the existence ratio of zirconium is 80% or more.

12. The positive electrode active material for a nonaqueous electrolyte secondary battery according to claim 1, wherein zirconium exists on the surface of the lithium-transition metal composite oxide in a ratio of 0.01 to 2 mol % zirconium with respect to the lithium-transition metal composite oxide.

13. The positive electrode active material for a nonaqueous electrolyte secondary battery according to claim 1, wherein zirconium exists on the surface of the lithium-transition metal composite oxide in a ratio of 0.02 to 0.3 mol % zirconium with respect to the lithium-transition metal composite oxide.

14. The positive electrode active material for a nonaqueous electrolyte secondary battery according to claim 1, wherein zirconium exists on the surface of the lithium-transition metal composite oxide in a ratio of 0.04 to 0.25 mol % zirconium with respect to the lithium-transition metal composite oxide.

15. The positive electrode active material for a nonaqueous electrolyte secondary battery according to claim 1, wherein the lithium cobaltate particle contains particles having a volume-based particle diameter of 50 µm or more in a ratio of 10 vol % or less with respect to total particles.

* * * * *